(12) United States Patent
Ravu et al.

(10) Patent No.: US 11,443,740 B1
(45) Date of Patent: Sep. 13, 2022

(54) CONTENT SELECTION BY NATURAL LANGUAGE PROCESSING SYSTEMS

(71) Applicant: Amazon Technologies, Inc., Seattle, WA (US)

(72) Inventors: Rahul Ravu, Seattle, WA (US); Ye He, Kirkland, WA (US); Felix Xiaomeng Wu, Seattle, WA (US); John Dunavent, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 350 days.

(21) Appl. No.: 16/711,727

(22) Filed: Dec. 12, 2019

(51) Int. Cl.
| | |
|---|---|
| *G10L 17/00* | (2013.01) |
| *G06F 3/16* | (2006.01) |
| *H04L 9/00* | (2022.01) |
| *G10L 15/22* | (2006.01) |
| *G10L 15/18* | (2013.01) |
| *H04L 9/06* | (2006.01) |
| *G10L 15/26* | (2006.01) |

(52) U.S. Cl.
CPC .............. *G10L 15/22* (2013.01); *G06F 3/167* (2013.01); *G10L 15/18* (2013.01); *G10L 15/26* (2013.01); *H04L 9/0643* (2013.01); *G10L 2015/223* (2013.01)

(58) Field of Classification Search
USPC ...................... 704/1–274; 725/9–36; 726/1–7
See application file for complete search history.

(56) References Cited

U.S. PATENT DOCUMENTS

| | | | | |
|---|---|---|---|---|
| 2011/0106633 | A1* | 5/2011 | Cook ..................... | G06Q 30/02 705/14.73 |
| 2013/0263182 | A1* | 10/2013 | Ivy ..................... | H04N 21/2668 725/34 |
| 2013/0339146 | A1* | 12/2013 | Goldberg ............... | G06Q 30/02 705/14.53 |
| 2015/0326905 | A1* | 11/2015 | Balakrishnan ... | H04N 21/44222 725/14 |
| 2017/0068987 | A1* | 3/2017 | Levinson ........... | G06Q 30/0246 |
| 2017/0186029 | A1* | 6/2017 | Morris ............... | G06Q 30/0243 |

(Continued)

OTHER PUBLICATIONS

Arsenault, "How to Measure the True Profitability of Your Email Campaigns Using Holdout Tests," Last Accessed Dec. 17, 2019, http://rejoiner.com/resources/measure-true-profitability-email-campaigns-using-holdout-tests/.

*Primary Examiner* — Marcellus J Augustin
(74) *Attorney, Agent, or Firm* — Pierce Atwood LLP

(57) ABSTRACT

Techniques for performing tests by a speech processing system are described. A speech processing system may apply a hash function to a group of user identifiers, a content provider identifier, and time data to segment the group of user identifiers into non-holdout, holdout control, and holdout treatment groups. A non-holdout group represents users not subject to a test for a duration of time. A holdout control group represents users subject to a test for the duration of time, but which do not receive unresponsive content during the duration of time. A holdout treatment group represents users subject to a test and which receive unresponsive content over the duration of time. User activity of the holdout control and holdout treatment groups may be compared to measure an effectiveness of the unresponsive content. The measured effectiveness may be used to determine a ranking of the content provider at runtime.

20 Claims, 15 Drawing Sheets

(56) References Cited

U.S. PATENT DOCUMENTS

2018/0277108 A1\* 9/2018 Badr ...................... G06N 3/006
2018/0336588 A1\* 11/2018 Kohareswaran ... G06Q 30/0243
2021/0383809 A1\* 12/2021 Vuskovic ................ G06F 40/35

\* cited by examiner

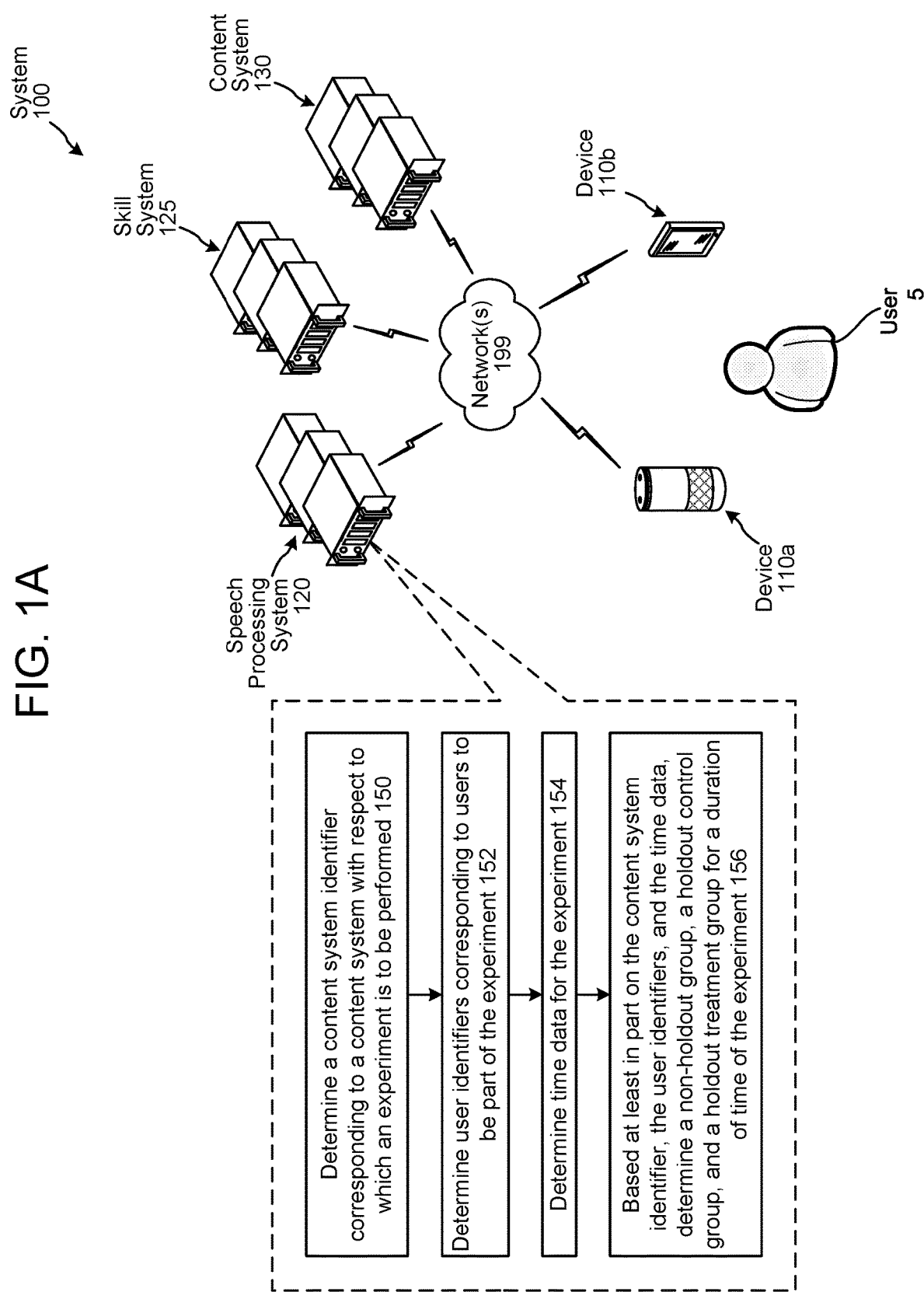

FIG. 1B
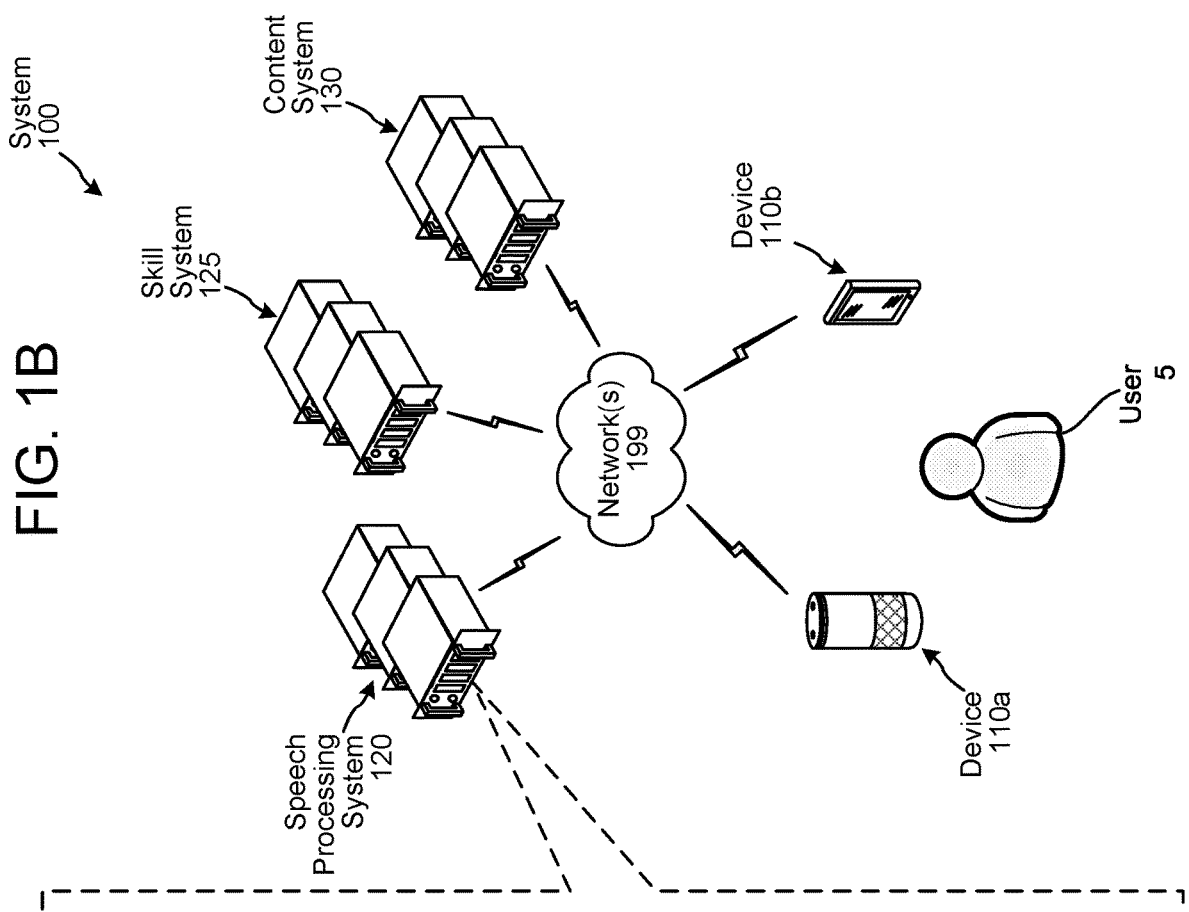
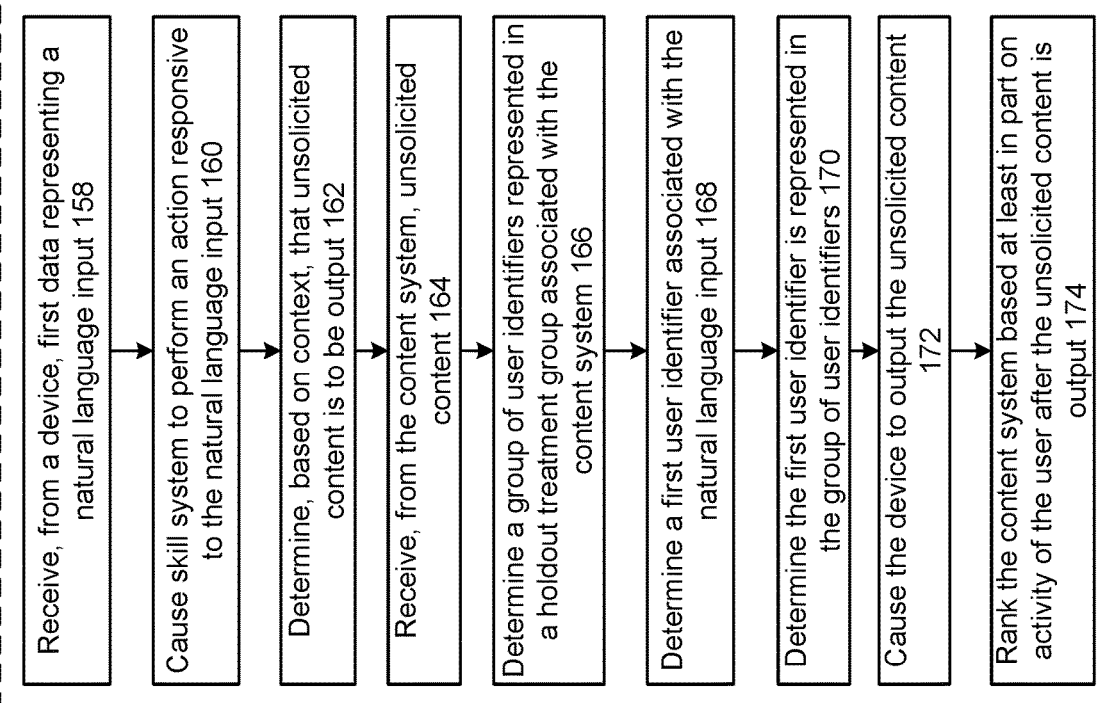

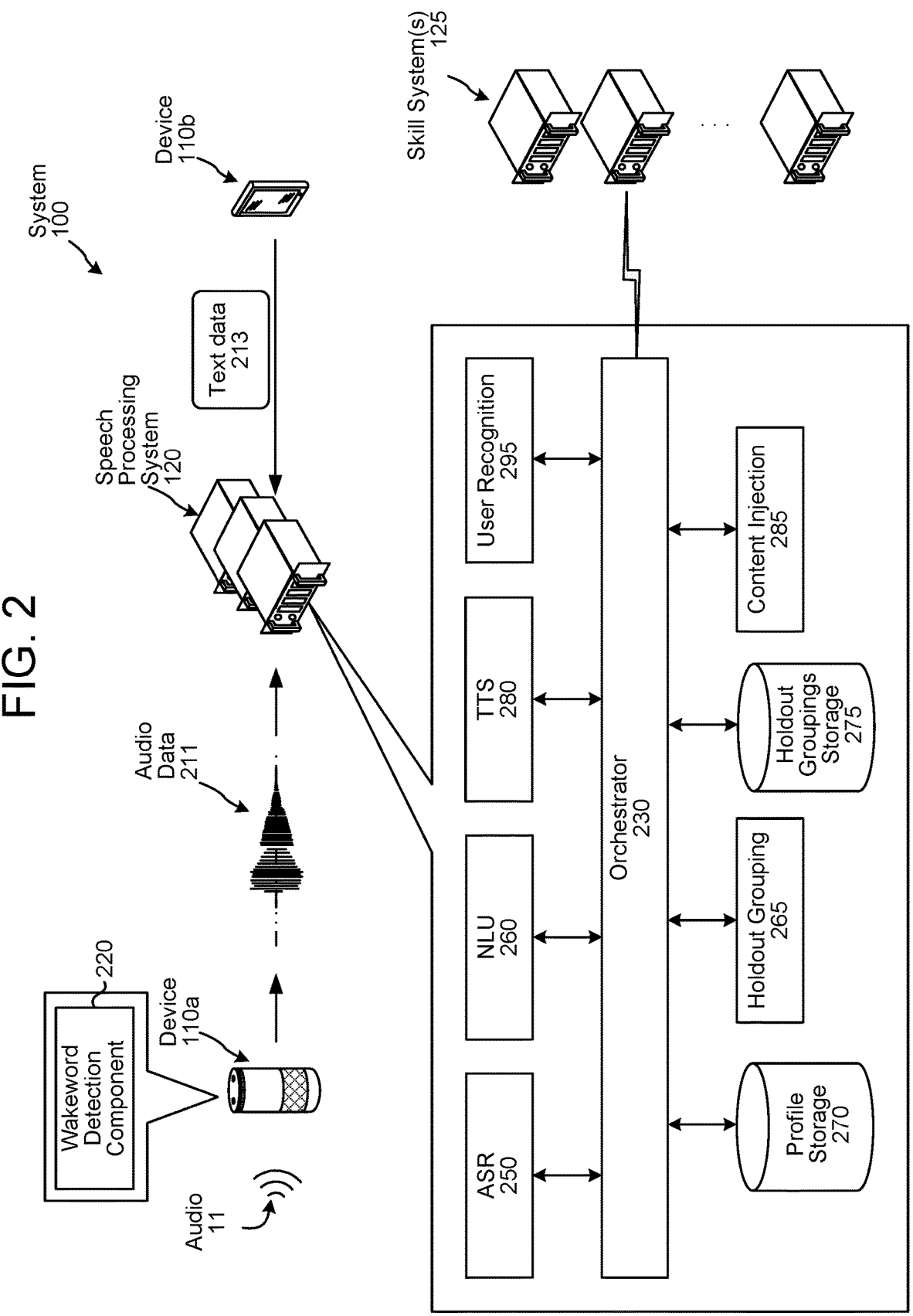

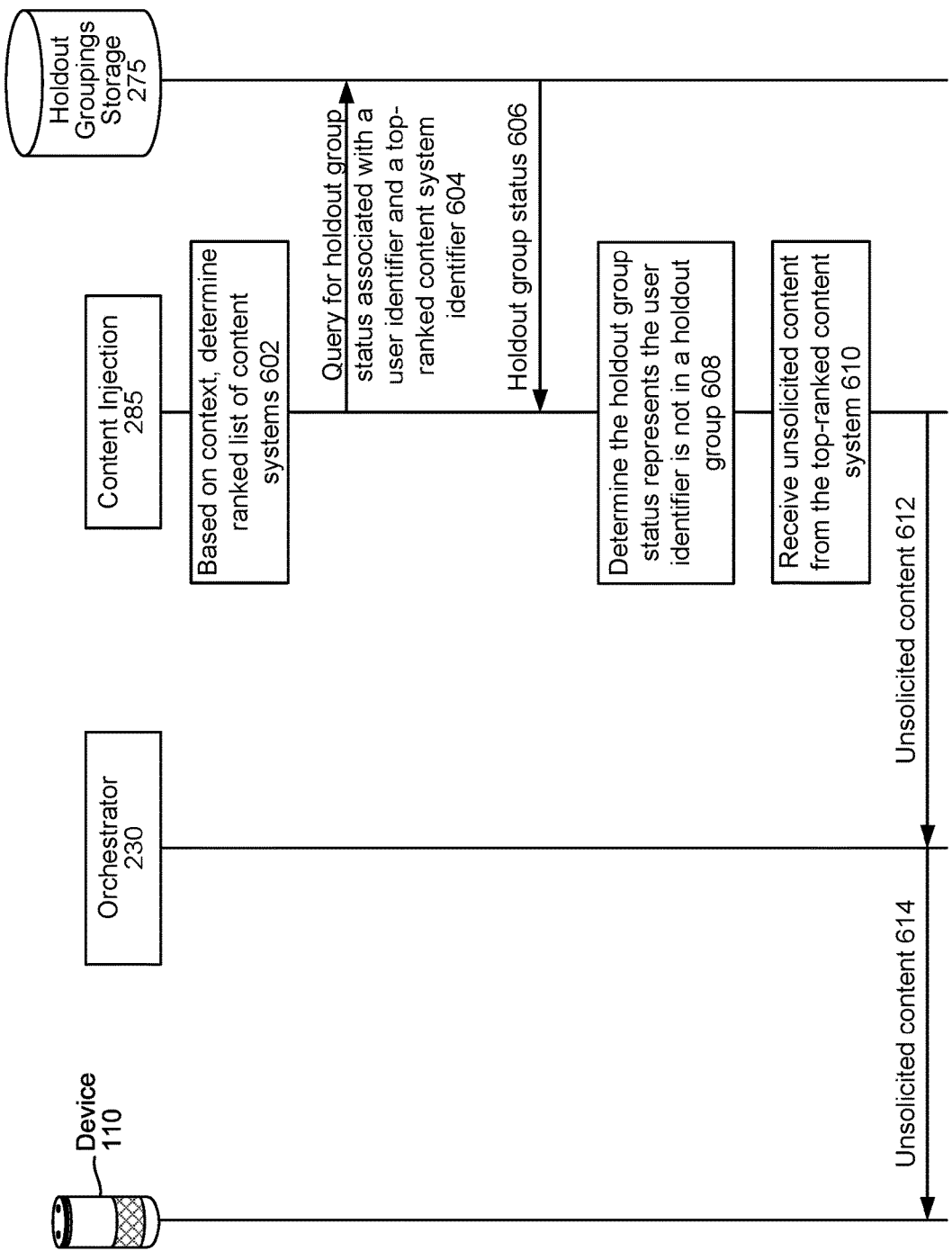

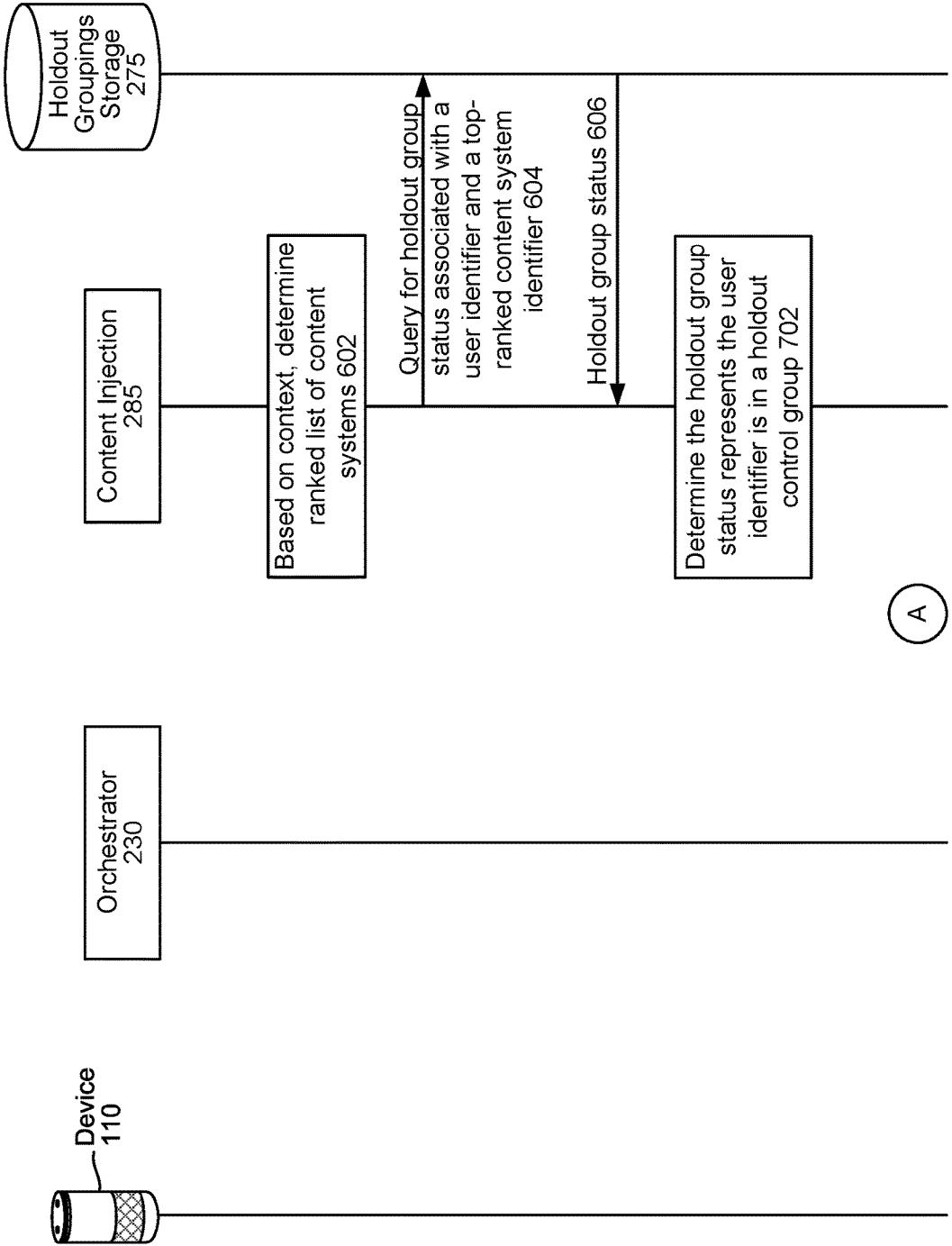

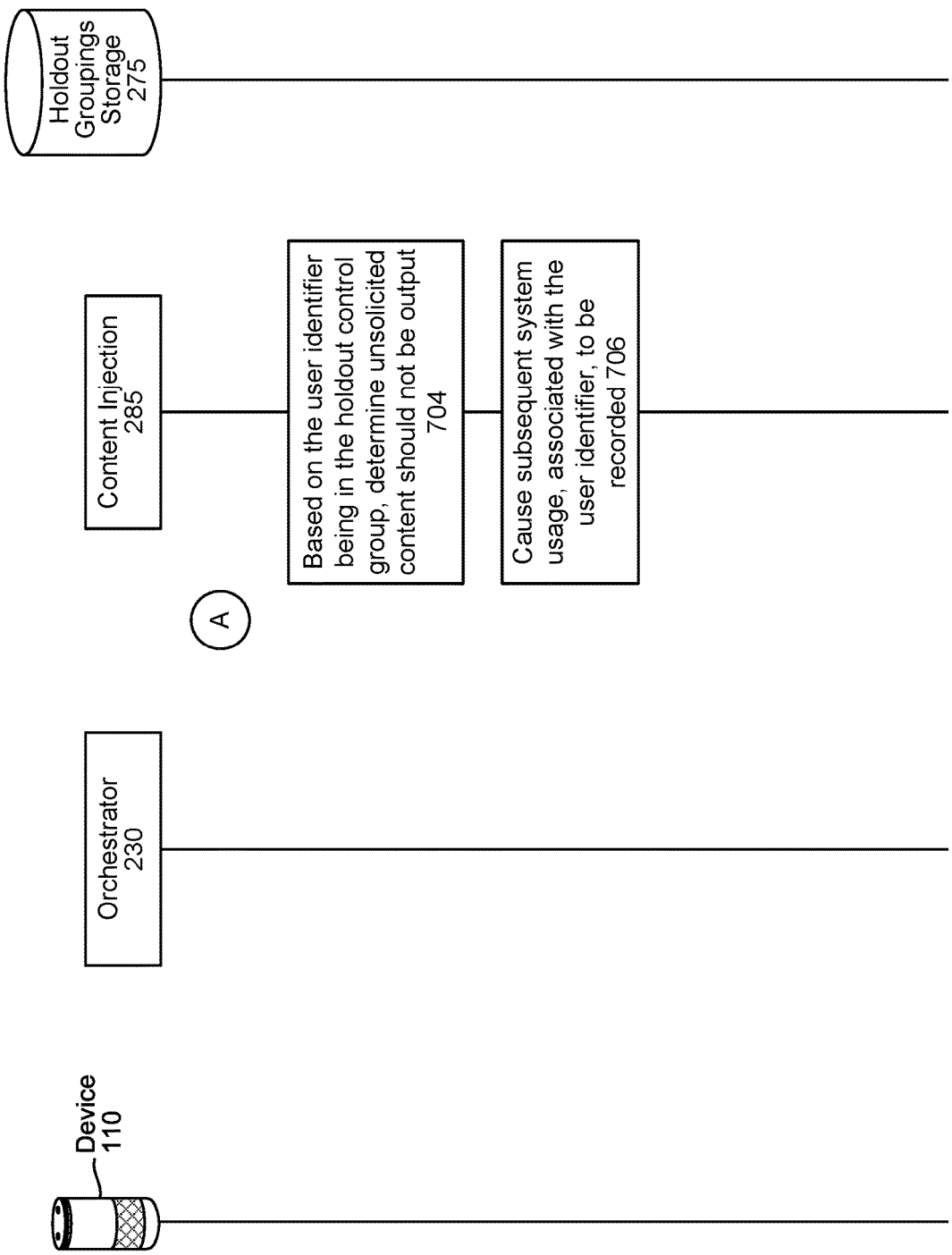

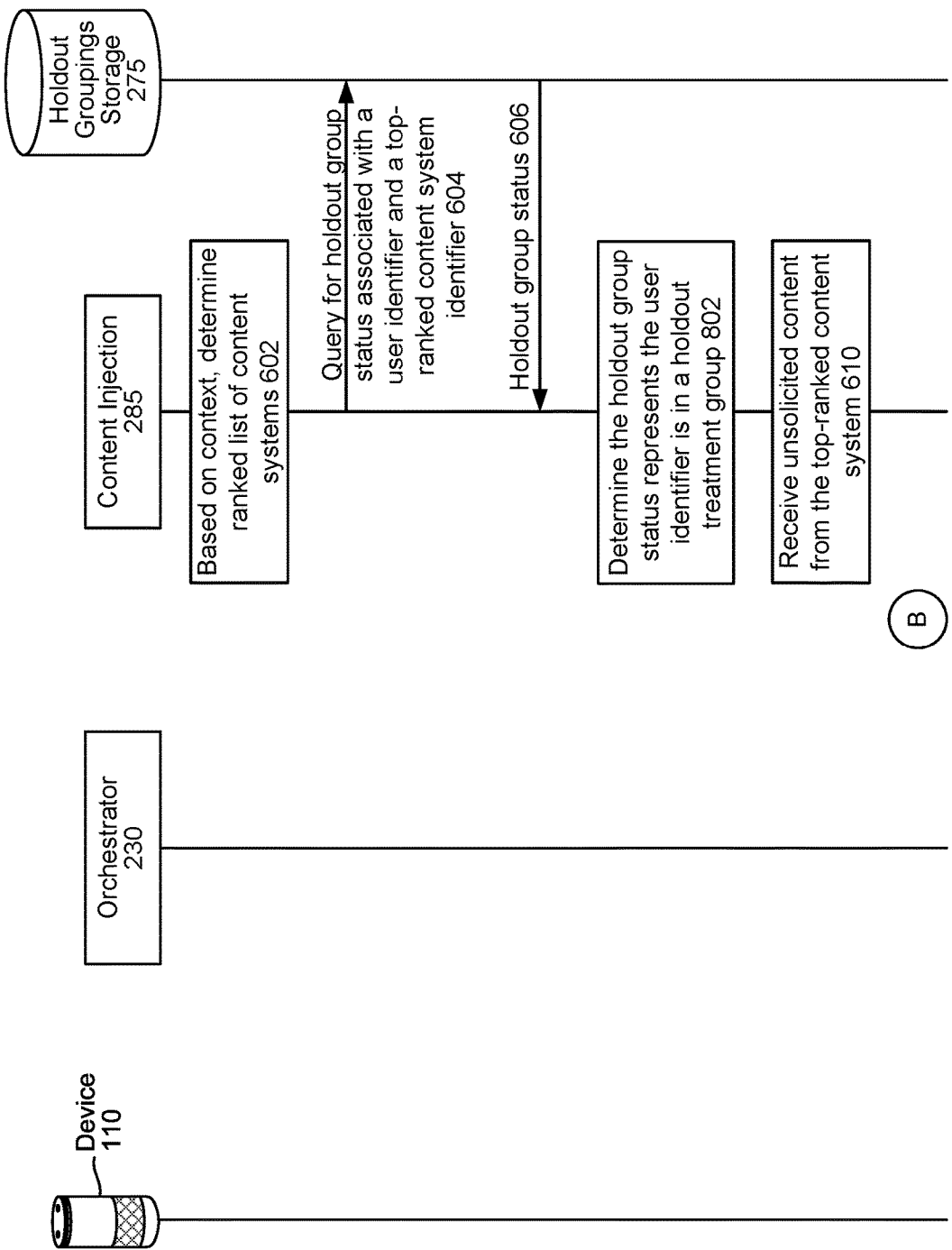

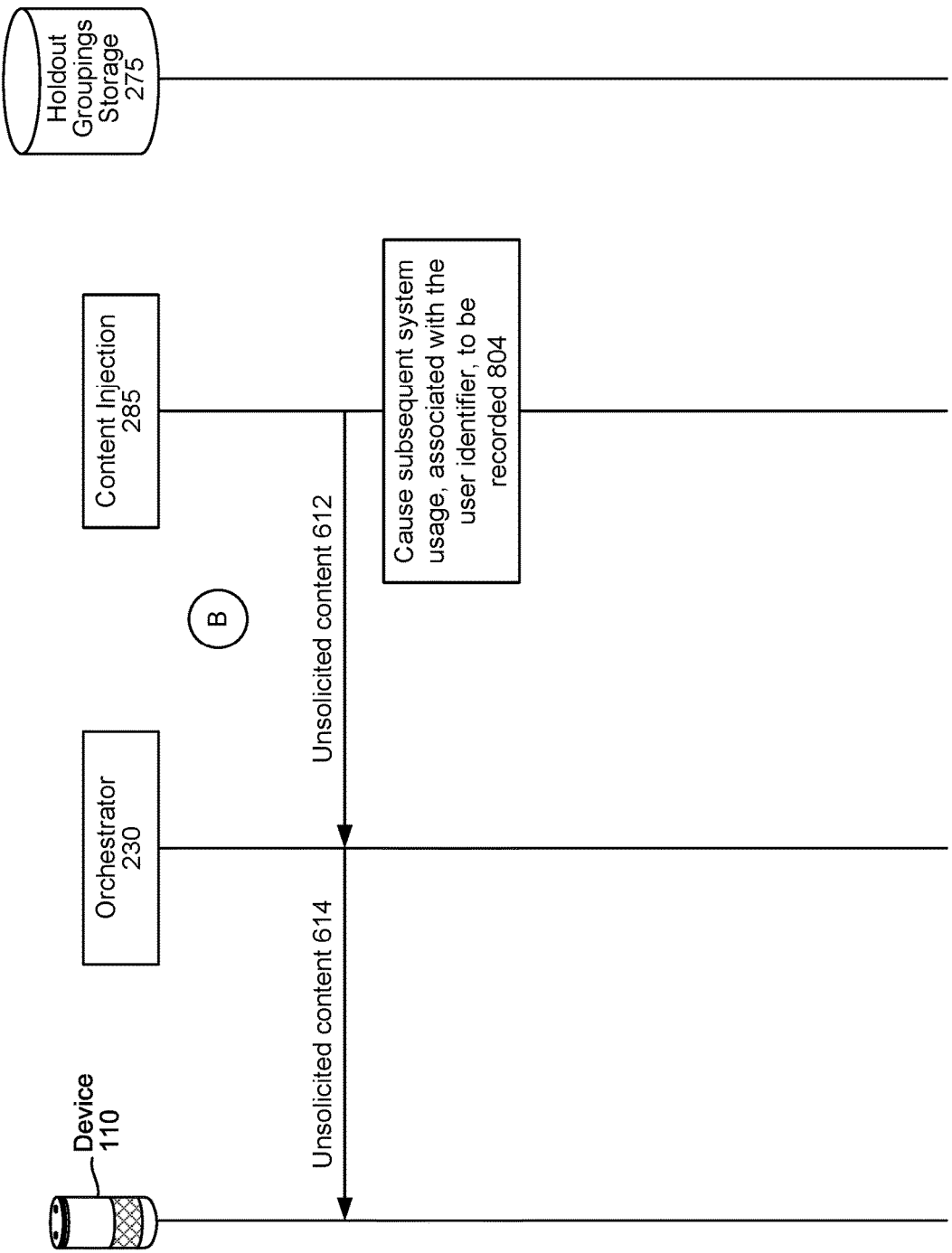

CONTENT SELECTION BY NATURAL LANGUAGE PROCESSING SYSTEMS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual diagram illustrating a system for generating holdout groups for a duration of time corresponding to an experiment specific to a content system.

FIG. 1B is a conceptual diagram illustrating a system configured to perform experiments using established non-holdout and holdout groups.

FIG. 2 is a conceptual diagram of components of the system.

FIG. 6 is a signal flow diagram illustrating processing when a user is not in a holdout group of an experiment.

FIGS. 7A and 7B are a signal flow diagram illustrating processing when a user is in a holdout control group of an experiment.

FIGS. 8A and 8B are a signal flow diagram illustrating processing when a user is in a holdout treatment group of an experiment.

DETAILED DESCRIPTION

Figure 3:
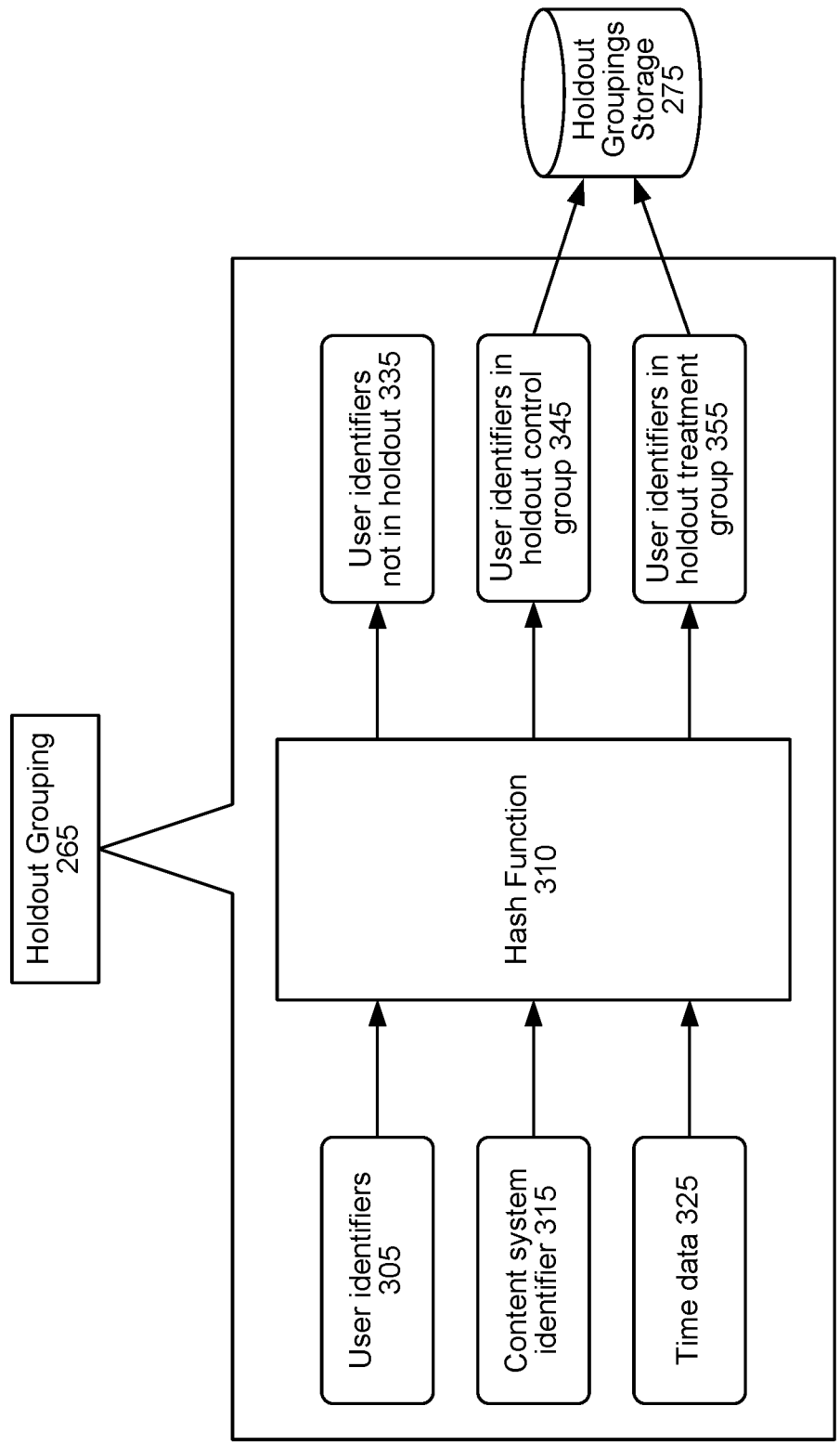
FIG. 3 is a conceptual diagram of processing performed by a holdout grouping component.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech.

A system may cause skill systems to perform actions in response to natural language inputs (e.g., spoken inputs and/or typed inputs). For example, for the natural language input "play Adele music," a music skill system may be invoked to output music sung by an artist named Adele. For further example, for the natural language input "turn on the lights," a smart home skill system may be invoked to turn on "smart" lights associated with a user's profile. In another example, for the natural language input "what is the weather," a weather skill system may be invoked to output weather information for a geographic location corresponding to the device that captured the natural language input. In the foregoing examples, actions correspond to the outputting of music, turning on of "smart" lights, and outputting of weather information. As such, as used herein, an "action" may refer to some result of a skill system's processing.

A system may receive a natural language input, process the natural language input to determine an action to be performed that is responsive to the natural language input, and invoke a skill system to perform the action. In at least some examples, after the action is performed, the system may output certain content that may be unresponsive to or otherwise unsolicited by the natural language input. In certain instances this may be referred to as "unsolicited content" as it is content that is system selected to be output to a user that is not necessarily solicited by the user via the natural language input, but is rather added into a dialog between a user and the system. As a non-limiting list, examples of such unsolicited content may include unsolicited information related to a something a machine learned model predicts the user may be interested in, such as a product available for purchase, recently published content for listening, information about a skill system for invoking, TTS speech for pleasantries (e.g., telling the user to have a nice day), etc. In other words, the system may proactively recommend/output unsolicited content to a user, namely without the user having expressly requested such content.

In at least some examples, an action performed in response to a natural language input and the unsolicited content unresponsive to the natural language input may correspond to different topics. For example, the action in response to the natural language input may correspond to weather information and the unsolicited content selected for output by the system may correspond to a gaming skill system. In at least some examples, the action and unsolicited content may correspond to different domains of the system. Example domains include, but are not limited to, music, video, flash briefing, smart home, etc.

While unsolicited content may be separate from a responsive content to a user input, in some embodiments it is desirable for the unsolicited content to enhance, rather than detract from, a user experience with the system. For example, in some embodiments it may be desirable for the unsolicited content to enhance the user experience by outputting, to the user, unexpected but helpful information, resulting in the user taking advantage of new features, or otherwise intended to impact the user positively. One goal of some embodiments of the system, therefore, can be to reduce the amount of undesired unsolicited content and to increase the amount of well-received unsolicited content.

The present disclosure improves such systems by providing a mechanism for, among other things, ranking systems that output the unsolicited content (sometimes referred to herein as "content systems"). Aspects of the present disclosure provide techniques for performing experiments for measuring various metrics that may be used to rank unsolicited content and/or content systems). In at least some examples, such experiments may be used to measure the effectiveness of output content from a particular content system, and the measured effectiveness may be used to rank the content and/or content system for future determinations as to when that content and/or content system should be selected as unsolicited content. Such experiments may include A/B testing, e.g., testing in which a first group of users do not receive unsolicited content and a second group of users receive unsolicited content. Such experiments may also include "evergreen" experiments, which may be experiments having no pre-defined end point. Accordingly, evergreen A/B testing may be A/B testing that is performed in some ongoing process.

In at least some examples, an experiment may measure (and be used to optimize future) unsolicited content selection using one or more rotating, user-based "holdout" groups. A system may apply a hash function to a group of user identifiers (in conjunction with other inputs to the hash function, such as content system identifier and time data) to segment the group of user identifiers into a "non-holdout group," a "holdout control group," and a "holdout treatment group." A non-holdout group of user identifiers represents users not subject to an experiment for a duration of time (e.g., 7 days, 30 days, etc.). A holdout control group of user identifiers represents users subject to an experiment for the duration of time, but which do not receive unsolicited content from a certain content system (e.g., the content system represented by the content system identifier input into the hash function). A holdout treatment group of user identifiers represents users subject to an experiment and which receive, for example, single unsolicited content (sent from the content system) over the duration of time. For example, if a content system sends different phrasings of "have a nice day," a user of the holdout treatment group would only receive a single phrasing of "have a nice day" during the duration that the user is in the holdout treatment group.

User activity of the holdout control group may be compared to user activity of the holdout treatment group to measure an effectiveness of the unsolicited content output to the holdout treatment group. For example, such comparison may be used to determine whether users, in the holdout treatment group, input more natural language inputs to the system after receiving the content system's unsolicited content, as compared to users in the holdout control group. For further example, such comparison may be used to determine whether users, in the holdout treatment group, converted on the content system's unsolicited content (e.g., purchased an advertised product, used an advertised skill system, downloaded a related application, etc.), as compared to users in the holdout control group that did not (on average) make such purchases, skill uses, application downloads, etc. The metric measured during a single experiment may change. The measured metric(s) may be used to determine (including adjusting a previously determined) ranking of the content system.

The holdout groups of an experiment (e.g., specific to a content system) may be rotated after the duration of time (e.g., 7 days, 30 days, etc.) has transpired. That is, after the duration of time transpires, the hash function may again be applied to a group of user identifiers to generate a non-holdout group, a holdout control group, and a holdout treatment group. These groups may then be used to conduct at least a portion of an experiment, as described above, for a second duration of time (e.g., a second 7 days, a second 30 days, etc.). This re-application of the hash function may occur in perpetuity such that the content system's ranking may be adjusted in perpetuity. Such may improve the user experience as such ranking may ensure users receive the top-ranked unsolicited content in any given situation.

A system may be configured to perform multiple of the foregoing described experiments. For example, the system may perform a first experiment with respect to a first content system, a second experiment with respect to a second content system, etc. As such, it will be appreciated that the experiment techniques described herein are, in at least some examples, content system agnostic as the only input (from a content system) to an experiment may be the unsolicited content to be output. Moreover, one content system's experiment may be independent from and uninfluenced by an experiment of another content system.

The experiment techniques described herein may be implemented with respect to various triggers. For example, the experiment techniques may be implemented with respect to spoken natural language inputs, typed natural language inputs, activation of a smart home sensor (such as a presence sensor detecting when a user enters their home), etc. For example, when a smart home sensor is triggered, a natural language input corresponding to the trigger may be sent to a system for processing.

A system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIGS. 1A and 1B show a system 100 configured to rank content systems. Although the figures and discussion of the present disclosure illustrate certain steps in a particular order, the steps described may be performed in a different order (as well as certain steps removed or added) without departing from the present disclosure. As shown in FIGS. 1A and 1B, the system 100 may include one or more devices (110a/110b) local to a user 5, a speech processing speech processing system 120, a skill system 125, and a content system 130. As illustrated, the one or more devices (110a/110b), the speech processing system 120, the skill system 125, and the content system 130 may communicate across one or more networks 199. While the user 5 is illustrated as being a human, other types of users (e.g., computing systems) may exist. Moreover, while the skill system 125 and content system 130 are separately illustrated, it will be appreciated that functionality, corresponding to the content system 130, may be implemented as part of a skill system 125, in at least some examples.

FIG. 1A includes a process flow illustrating how the speech processing system 120 may generate holdout groups for a duration of time corresponding to an experiment specific to a content system. The system 100 may include various content systems configured to output content with respect to natural language inputs, but unresponsive to the natural language inputs (e.g., unsolicited content). The speech processing system 120 may determine an experiment is to be performed with respect to a content system, and may determine (150) a content system identifier corresponding to the content system 130.

The speech processing system 120 may additionally determine (152) user identifiers corresponding to users that are to be part of the experiment. In at least some examples, the determined user identifiers may be all user identifiers stored by the speech processing system 120. In at least some examples, the determined user identifiers may be a subset of the user identifiers stored by the speech processing system 120. For example, the determined user identifiers may correspond to users of at least a certain age (e.g., at least 18 years old), may correspond to users in a specific geographic location (e.g., a country, state, county, etc.), may correspond to users of a specific race, may correspond to users of a specific gender, or may correspond to users corresponding to some other criteria. Further details of how to determine the user identifiers are described below.

The speech processing system 120 may determine (154) time data for the experiment. An example of the time data is a timestamp. In at least some examples, the time data corresponds to when the experiment, for the content system, was initially commenced.

The speech processing system 120 may, based at least in part on the content system identifier, the user identifiers, and the time data, determine (156) a non-holdout group, a holdout control group, and a holdout treatment group for a duration of time (e.g., 7 days, 30 days, etc.) the experiment. Further details for determining the non-holdout, holdout control, and holdout treatment groups are described below in reference to FIG. 3.

One skilled in the art will appreciate that determining the non-holdout and holdout groups based at least in part on the content system identifier may result in the non-holdout and holdout groups being specific to the content system-specific experiment. As such, it will be appreciated that the speech processing system 120 may perform, simultaneously, experiments specific to different content systems, with each experiment having non-holdout and holdout groups specific to the content system to which the experiment corresponds. In other words, non-holdout and holdout groups for one content system's experiment may be computed independently of non-holdout and holdout groups for another content system's experiment.

A single user may be part of holdout groups of different content system-specific experiments at the same time. Although a user may be part of holdout groups of different content system-specific experiments at the same time, the experiment of each content system's effectiveness may be measured by the speech processing system 120 independently.

In at least some examples, even though a user is part of holdout groups of different content system-specific experiments at the same time, the speech processing system 120 may be configured to only output, to the user, unsolicited content received from a first content system. This may ensure user activity, caused by receiving unsolicited content from the first content system, does not pollute the experiment designed to measure user activity caused by output of unsolicited content output by a second content system.

In at least some examples, the speech processing system 120 may apply a hash function to the content system identifier, the user identifiers, and the time data to determine the non-holdout and holdout groups. Various hash functions are envisioned, and the present disclosure is not limited to any particular hash function. In at least some examples, the hash function may be a stateless hash function. In examples where a stateless hash function is implemented, whether a user is put in a holdout group may be independent of any specific time (e.g., independent of when the stateless hash function is implemented).

The speech processing system 120 may compute new non-holdout and holdout groups, for the same content system-specific experiment more than once over the duration of the experiment. For example, the speech processing system 120 may compute new non-holdout and holdout groups, for a single content system-specific experiment, once every 7 days, once every 30 days, etc. In such examples, re-computation of the non-holdout and holdout groups may include the speech processing system 120 re-performing steps 152-156.

Although the above describes holdout treatment group users receiving unsolicited content once over the duration that the holdout treatment group persists, the present disclosure is not limited thereto. That is, a user of a holdout treatment group may receive unsolicited content, output by a single content system with respect to which the holdout treatment group was created, more than once during the persistence of the holdout treatment group.

One skilled in the art will appreciate that the user identifiers used to compute a first instance of non-holdout and holdout groups may be different from the user identifiers used to compute a second instance of non-holdout and holdout groups for the same content system-specific experiment. Such change may occur due to, for example, at least one new user becoming a member of the speech processing system 120 after the first groupings are computed but before the second groupings are computed, at least one user deleting its speech processing system 120-stored profile after the first groupings are computed but before the second groupings are computed, at least one user satisfying a criteria (for determining the user identifiers at step 152) after the first groupings are computed but before the second groupings are computed, at least one user that satisfied a criteria (for determining the user identifiers at step 152) during computation of the first groupings no longer satisfying the criteria when the second groupings are being computed, etc.

Although the user identifiers, used to generate groupings, may change over time, the time data may remain the same, in at least some examples. For example, the time data may remain the same, over various iterations of computing non-holdout and holdout groupings for the same content system-specific experiment, when the time data corresponds to a time when the content system-specific experiment was commenced.

In at least some examples, the speech processing system 120 may be configured such that the probability that a user will be grouped into a holdout group for an indefinite period of time decreases exponentially as the user is in the holdout group for consecutive experiments (discrete durations of time, such as 7 days, 30 days, etc.).

In at least some examples, using a duration for holdout groups (prior to the holdout groups being recomputed) based on calendar days may be unbeneficial as. For example, if one holdout group is created at 10 am and another holdout group is created at 7 pm, and both holdout groups are configured to persist for 7 calendar days, the holdout group created at 10 am may persist for 6 full calendar days and 14 hours (counting for the calendar day on which the holdout group was created), whereas the holdout group created at 7 pm may persist for 6 full calendar days and 5 hours (counting for the calendar day on which the holdout group was created).

In at least some examples, to ensure each holdout group persists for the same amount of time, a holdout group may be configured to persist for 24 hours× the number of days a holdout group is to persist. Such calculation thus ensures that each holdout groups persists for the same amount of hours, regardless of what time of day a holdout group is created.

At some point, the device 110a may receive audio corresponding to a spoken natural language input originating from the user 5. The device 110a may generate audio data corresponding to the audio and may send the audio data to the speech processing system 120. Alternatively, the device 110b may receive a typed natural language input from the user 5. The device 110b may generate text data corresponding to the typed input and may send the text data to the speech processing system 120.

The device 110 may send the audio data and/or the text data to the speech processing system 120 via an application that is installed on the device 110 and associated with the speech processing system 120. An example of such an application is the Amazon Alexa application that may be installed on a smart phone, tablet, or the like.

With reference to FIG. 1B, the speech processing system 120 may receive (158) first data representing the natural language input. The first data may be audio data or text data sent from the device 110a or 110b, respectively.

The speech processing system 120 may cause (160) the skill system 125 to perform an action responsive to the natural language input. For example, for the natural language input "play Adele music," the skill system 125 may cause the device (110a/110b) to output music sung by an artist named Adele. For further example, for the natural language input "turn on the lights," the skill system 125 may cause "smart" lights, associated with the user 5's profile, to be turned on. In another example, for the natural language input "what is the weather," the skill system 125 may cause the device (110a/110b) to output weather information (for a geographic location corresponding to the device (110a/110b) or represented in the user 5's profile). One skilled in the art will appreciate that the speech processing system 120 may receive various natural language inputs and, thus, that the foregoing pairings of natural language user inputs and actions are merely illustrative.

The speech processing system 120 may determine (162) that, based on context, unsolicited content is to be output to the user. For example, the speech processing system 120 may determine the user routinely inputs, to the speech processing system 120, a natural language input to purchase a product after the speech processing system 120 receives, from the user, the natural language input that was received at step 158. Other examples are possible and discussed in more detail herein. Based on this, the speech processing system 120 may determine information, pertaining to a purchasable product or service, should be output to the user.

The speech processing system 120 may receive (164), from the content system 130, unsolicited content, which is unresponsive to the natural language input received at step 158. For example, the unsolicited content may represent a product or service offered by the content system.

The speech processing system 120 may determine (166) a group of user identifiers represented in a hold treatment group associated with the content system 130. As the holdout treatment group associated with the content system 130 changes over time (as described above with respect to FIG. 1A), the determined group of user identifiers may represent users in the holdout treatment group of the content system at the time the natural language input (received at step 158) was received.

The speech processing system 120 may determine (168) a first user identifier associated with the natural language input. In other words, the speech processing system 120 may determine a first user identifier corresponding to the user 5 that input the natural language input.

The speech processing system 120 may determine (170) the first user identifier is represented in the group of user identifiers. After determining the first user identifier is represented in the group of user identifiers, the speech processing system 120 may cause (172) the device (110a/110b) (or another device associated with the first user identifier, such as one determined to be presently detecting the user 5) to output the unsolicited content.

The speech processing system 120 may thereafter store a record of the user 5's activity (e.g., whether the user 5 inputs a further natural language input indicating the user 5 wants to purchase a product or service referenced in the unsolicited content, and use the user 5's activity to rank (174) (or adjust a previously calculated rank) of the content system 130.

The system 100 may operate using various components as described in FIG. 2. The various components may be located on a same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the speech processing system 120. As indicated previously, the device 110a may be configured to detect various wakewords, with each wakeword corresponding to a different assistant. In at least some examples, a wakeword may correspond to a name of an assistant. An example wakeword/assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected, the device 110a may "wake" and begin transmitting audio data 211, representing the audio 11, to the speech processing system 120. The audio data 211 may include data corresponding to the detected wakeword, or the device 110a may remove the portion of the audio corresponding to the detected wakeword prior to sending the audio data 211 to the speech processing system 120.

The speech processing system 120 may include an orchestrator component 230 configured to receive the audio data 211 (and optionally and assistant identifier) from the device 110a. The orchestrator component 230 may send the audio data 211 to an ASR component 250.

The ASR component 250 transcribes the audio data 211 into ASR results data (e.g., text data) include one or more ASR hypotheses (e.g., in the form of an N-best list). Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

The device 110b may receive a typed (or other text-based) natural language input. The device 110b may generate text data 213 representing the typed natural language input. The device 110b may send the text data 213 to the speech processing system 120, wherein the text data 213 is received by the orchestrator component 230.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device (110a/110b), the speech processing system 120, a skill system 125, etc.) to execute the intent. For example, if the text data corresponds to "play Adele music," the NLU component 260 may determine a <PlayMusic> intent and may identify "Adele" as an artist. For further example, if the text data corresponds to "what is the weather," the NLU component 260 may determine an <OutputWeather> intent. In another example, if the text data corresponds to "turn off the lights," the NLU component 260 may determine a <DeactivateLight> intent. The NLU component 260 may output NLU results data (which may include tagged text data, indicators of intent, etc.).

As described above, the speech processing system 120 may perform speech processing using two different components (e.g., the ASR component 250 and the NLU component 260). One skilled in the art will appreciate that the speech processing system 120, in at least some examples, may implement a spoken language understanding (SLU) component that is configured to process audio data 211 to generate NLU results data.

In some examples, the SLU component may be equivalent to the ASR component 250 and the NLU component 260. While the SLU component may be equivalent to a combination of the ASR component 250 and the NLU component 260, the SLU component may process audio data 211 and directly generate the NLU results data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. In some examples, the SLU component outputs a most likely NLU hypothesis, or multiple NLU hypotheses in the form of a lattice or an N-best list with individual NLU hypotheses corresponding to confidence scores or other scores (such as probability scores, etc.).

The speech processing system 120 may communicate with one or more skill systems 125. A skill system 125 may be configured to execute with respect to NLU results data. For example, for NLU results data including a <GetWeather> intent, a weather skill system may determine weather information for a geographic location represented in a user profile or corresponding to a location of the device 110 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill system 125 may operate in conjunction between the speech processing system 120 and other devices, such as the device 110, in order to complete certain functions. Inputs to a skill system 125 may come from speech processing interactions or through other interactions or input sources.

A skill system 125 may be associated with a domain. A non-limiting list of illustrative domains includes a smart home domain, a music domain, a video domain, a flash briefing domain, a shopping domain, and/or a custom domain.

The speech processing system 120 may include a TTS component 280. The TTS component 280 may generate audio data (e.g., synthesized speech) from text data using one or more different methods. Text data input to the TTS component 280 may come from a skill system 125, the orchestrator component 230, or another component of the system 100.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The speech processing system 120 may include a user recognition component 295. In at least some examples, the user recognition component 295 may be implemented as a skill system 125.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, etc.), received by the speech processing system 120 in correlation with a natural language input, to stored biometric data of users. The user recognition component 295 may additionally or alternatively perform user recognition by comparing image data (e.g., including a representation of at least a feature of a user), received by the speech processing system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system 125, as well as processing performed by other components of the speech processing system 120 and/or other systems.

The speech processing system 120 may include profile storage 270. The profile storage 270 may include a variety of information related to individual users, groups of users, devices, etc. that interact with the speech processing system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 270 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill systems 125 that the user has expressly permitted to execute with respect to the user's natural language inputs. If a user does not provide such permission for a skill system 125, the speech processing system 120 may not invoke the skill system 125 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

The speech processing system 120 may include a holdout grouping component 265. The holdout grouping component 265 may be configured to generate holdout control groups and holdout treatment groups for experiments.

FIG. 3 illustrates example processing of the holdout grouping component 265. As illustrated, the holdout grouping component 265 may implement a hash function 310. The hash function 310 may be a mathematical function, for example a function that maps arbitrary-sized data to random fixed-size values. For example, the hash function 310 may take as input user identifiers 305, a content system identifier 315, and time data 325 (e.g., corresponding to a beginning of a corresponding content system-specific experiment), and output a respective hash value for each user identifier 305 input therein. For example, the hash function 310 may be configured to generate hash value between 0 and 99. Thus, for example, one user identifier may be associated with a hash value of 0.12, another user identifier may be associated with a hash value of 0.56, another user identifier may be associated with a hash value of 0.89, etc. The hash function 310 may be a hash function known in the art or not yet known.

The holdout grouping component 265 may separate the user identifiers and corresponding hash values, output from the hash function, based on percentages. For example, the holdout grouping component 265 may determine user identifiers 335, corresponding to a "not holdout group," as corresponding to the lowest 95%-scoring hash values output by the hash function 310. Further the foregoing example, the holdout grouping component 265 may determine user identifiers, corresponding to a "holdout group," as corresponding to the top 5%-scoring hash values. Moreover, in at least some examples, the holdout grouping component 265 may determine that, of the "holdout group" user identifier and corresponding hash values, the user identifiers 345 corresponding to the bottom 50%-scoring hash values may correspond to a holdout control group, and the user identifiers 355 corresponding to the top 50%-scoring hash values may correspond to a holdout treatment group. One skilled in the art will appreciate that the foregoing percentage breakdowns are merely illustrative, and that the holdout grouping component 265 may be configured to group user identifiers and corresponding hash values, output by the hash function 310, using various different percentages (or other segregation techniques).

In at least some examples, the user identifiers 305, input to the hash function 310 may correspond to all user identifiers stored by the speech processing system 120. In at least some other examples, the user identifiers 305, input to the hash function 310, may correspond to a portion of the user identifiers stored by the speech processing system 120. In at least some examples, the portion of user identifier stored by the speech processing system 120 may be determined based on one or more of user age, geographic location (e.g., a country, state, county, etc.), user race, user gender, and/or some other user-differentiating criteria.

It will be appreciated that the foregoing processing of the holdout grouping component 265 may be performed for different content system-specific experiments. It will additionally be appreciated that the holdout grouping component 265 may perform the foregoing processing more than once for each content system-specific experiment. Specifically, the holdout grouping component 265 may perform the foregoing processing each time new holdout control and holdout treatment groups need to be determined for a content system-specific experiment.

Figure 4:
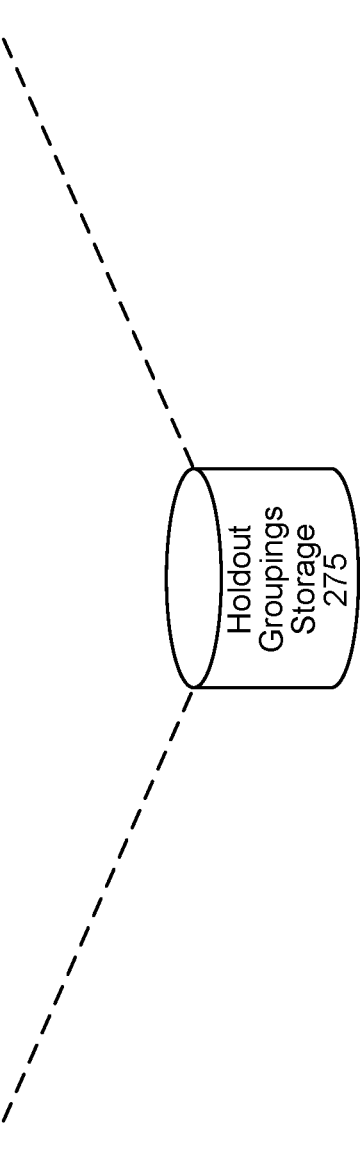
FIG. 4 is a conceptual diagram illustrating data that may be stored in a holdout groupings storage.

The holdout grouping component 265 may send the user identifiers 345, corresponding to the holdout control group, and the user identifiers 355, corresponding to the holdout treatment group, to a holdout groupings storage 275 (which may, in at least some examples, be stored by the speech processing system 120 as illustrated in FIG. 2). The holdout groupings storage 275 may store, for various content system-specific experiments, user identifiers with associated holdout group statuses (as illustrated in FIG. 4). For example, as illustrated in FIG. 4, a user identifier may be associated with a content system identifier (corresponding to a particular content system-specific experiment) and holdout status group (e.g., representing the user identifier is associated with either a holdout treatment group or a holdout control group for the experiment). While FIG. 4 illustrates that the holdout groupings storage 275 may store data with respect to more than one content system-specific experiment, it will be appreciated that the present disclosure is not limited thereto. For example, the speech processing system 120 may store different holdout groupings storages, with each holdout groupings storage storing data unique to a single content system-specific experiment.

While not necessary, in at least some examples, the holdout groupings storage 275 may also store the hash values generated by the hash function 310 for the user identifiers represented in the holdout groupings storage 275.

As detailed above, the holdout grouping component 265 may, over time, determine different holdout groups for a single content system-specific experiment. In such examples, newly determined holdout groups may be stored in the holdout groupings storage 275, and the previous holdout groups data (corresponding to the same content system-specific experiment) may be deleted from the holdout groupings storage 275. Such results in current holdout groups being the only holdout groups represented in the holdout groupings storage 275.

Referring back to FIG. 2, the speech processing system 120 may additionally include a content injection component 285. The content injection component 285 may be invoked at runtime to determine when unsolicited content is to be output, as well as determine what unsolicited content is to be output in a specific situation.

Figure 5:
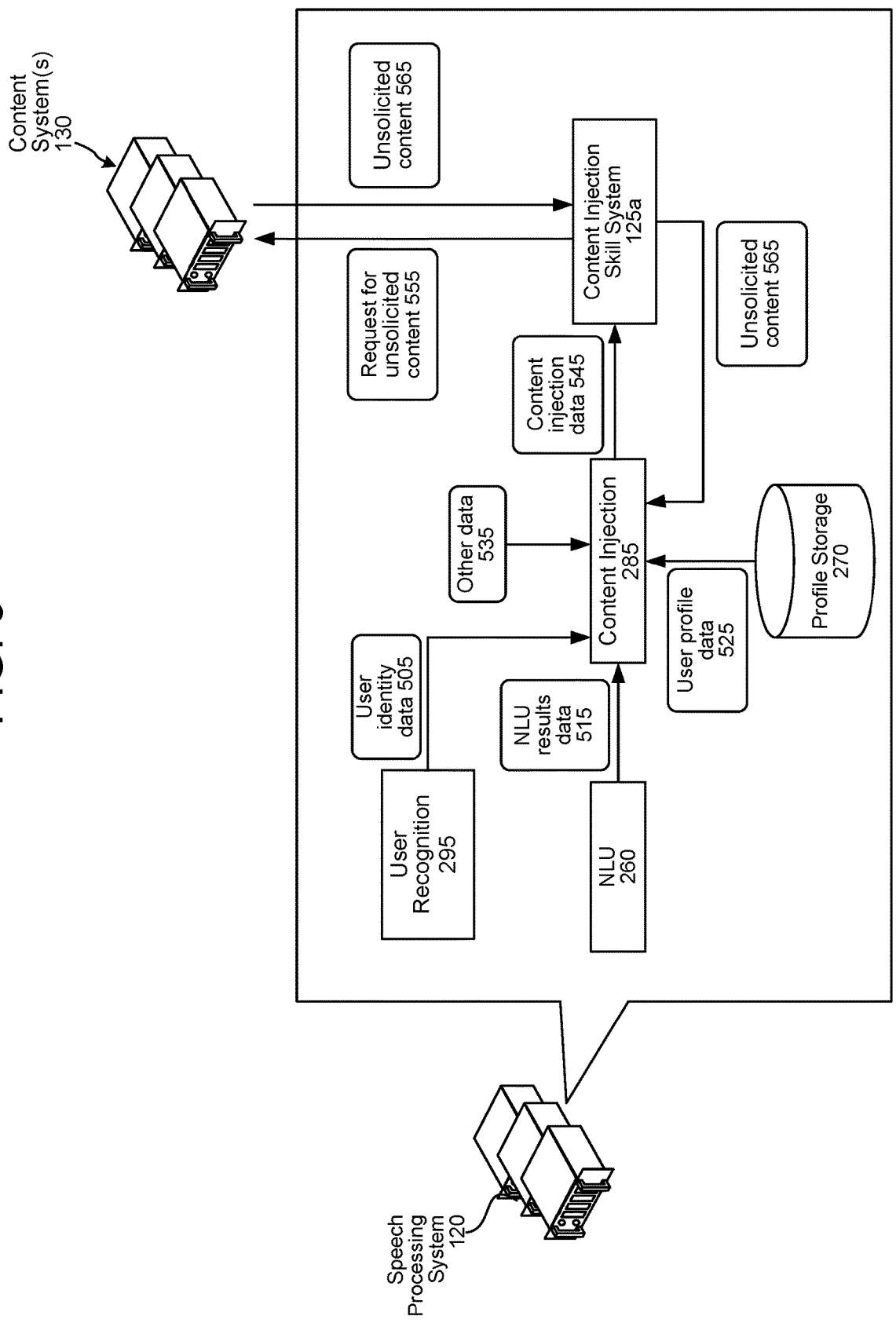
FIG. 5 is a conceptual diagram illustrating how a content injection component may determine when unsolicited content (e.g., content associated with but not directly responsive to a natural language input) should be output.

FIG. 5 illustrates how the content injection component 285 may determine when unsolicited content (e.g., associated with but not directly responsive to a natural language input) should be output. As illustrated, the various components in FIG. 5 communicate directly. It will be appreciated that some or all of the components illustrated in FIG. 5 may communicate through the orchestrator component 230. In addition, while FIG. 5 illustrates a dedicated content injection component 285, it will be appreciated that some or all of the processes performed by the content injection component 285 disclosed herein may be performed by one or more other components of the speech processing system 120, such as the orchestrator component 230.

Each time the NLU component 260 outputs NLU results data 515, the NLU results data 515 may be sent to the content injection component 285. The content injection component 285 may determine whether unsolicited content, associated with but not directly responsive to the natural language input represented by the NLU results data 515, should be output to the natural language input-originating user 5.

The content injection component 285 may base its determinations at least in part on non-user specific data, such as skill system 125-output data.

The content injection component 285 may determine whether unsolicited content should be output based at least in part on information accompanying data responsive to a natural language input and received by the speech processing system 120 from a skill system 125. Such information is represented as other data 535 in FIG. 5. In addition to sending, to the speech processing system 120, data responsive to a natural language input, a skill system 125 may send, to the speech processing system 120, presentation framework data indicating, for example, the types of content (e.g., audio, image, video, etc.) represented in the data (responsive to the natural language input) as well as one or more devices associated with the natural language input-originating user 5 that should be used to output the different types of content. The presentation framework data may, in at least some examples, include information indicating the speech processing system 120 should determine unsolicited content. When the presentation framework data includes such information, the content injection component 285 may determine unsolicited content should be output. In at least some other examples, such information may simply be an input into a model run by the content injection component 285 for determining when unsolicited content is to be output.

The content injection component 285 may determine whether unsolicited content should be output based at least in part on data that is received by the speech processing system 120 from a skill system 125, but which does not accompany data responsive to a natural language input. Such data is represented as other data 535 in FIG. 5. A skill system 125 may output, to the speech processing system 120, data indicating that any time the NLU results data 515 includes a particular intent, the content injection component 285 should query the skill system 125 as to whether the skill system 125 has unsolicited content that may be output. For example, a concert ticket skill system may output, to the speech processing system 120, data indicating that anytime the NLU results data 515 includes a <PlayMusic> intent, the content injection component 285 should query the concert ticket skill system as to whether the concert ticket skill system has access to information indicating a concert put on by an artist represented in the NLU results data 515. For further example, an electronic calendar skill system may output, to the speech processing system 120, data indicating that anytime the NLU results data 515 includes an <OutputTime> intent, the content injection component 285 should query the electronic calendar skill system as to whether the electronic calendar skill system has calendar entries associated with an electronic calendar associated with the natural language input-originating device 110 and/or user 5. Yet further, for example, a traffic report skill system may output, to the speech processing system 120, data indicating that anytime the NLU results data 515 includes a <BookRide> intent, the content injection component 285 should query the traffic report skill system to output current traffic report information.

The content injection component 285 may determine whether unsolicited content should be output based at least in part on an intent represented in the NLU results data 515. The speech processing system 120 may store intent pair data (illustrated as other data 535 in FIG. 5) corresponding to pairs of intents. Each pair of intents may be associated with a respective score representing a likelihood that a second natural language input, corresponding to the second intent of the pair, will be received from the same user within a time threshold subsequent to content responsive to the first natural language input being output. The scores of various intent pairs may be normalized. The intent pair data may be untailored with respect to any given user of the system. For example, the intent pair data may include the following intent pairs with corresponding scores:

[0.345] <GetWeather>; <GetTraffic>
[0.217] <OrderPizza>; <PlayMovie>
[0.121] <PlayMusic>; <SetVolume>

The intent pair data may be configured based solely upon the natures of the intents. For example, a pair of intents may include a <PlayMusic> intent and a <ChangeVolume> intent. The pair of intents may be associated with a score representing a likelihood that a user may input a first natural language input, corresponding to the <PlayMusic> intent, prior to the user inputting a second natural language input, corresponding to the <ChangeVolume> intent, based solely on the <PlayMusic> intent and the <ChangeVolume> intent both relating to the output of audio. For further example, a pair of intents may include a <BookPlaneTicket> intent and a <GetWeather> intent. This pair of intents may be associated with a score indicating a likelihood that users who purchase plane tickets often ask about the weather for their destination.

Intents may also be paired based on system usage history associated with various different users. Pairing of the intents may be skill system agnostic. Thus, a single skill system may be associated with both intents of a pair of intents, or a first intent of a pair may be associated with a first skill system while the second intent of the pair may be associated with a second skill system. For example, a pair of intents may include a <PlayMusic> intent and a <ChangeVolume> intent, where both the <PlayMucic> intent and the <ChangeVolume> intent correspond to a same music skill system. For further example, a pair of intents may include a <BookPlaneTicket> intent and a <GetWeather> intent, where the <BookPlaneTicket> intent corresponds to a booking skill system and the <GetWeather> intent corresponds to a weather skill system.

Intent pairings may additionally or alternatively be agnostic with respect to the 1P or 3P nature of the skill systems associated with the intents. That is, both of the intents of a pair may be associated with one or more 1P skill systems (e.g., skill systems operated as part of the speech processing system 120), both of the intents of a pair may be associated with one or more 3P skill systems (e.g., skill systems operated separately from but in communication with the speech processing system 120), or a first intent of a pair may be associated with a 1P skill system while the second intent of the pair is associated with a 3P skill system. For example, a pair of intents may include a <PlayMusic> intent and a <ChangeVolume> intent, where both the <PlayMusic> intent and the <Change Volume> intent are executed by a 1P skill system. For further example, a pair of intents may include a <PlayMusic> intent and a <ChangeVolume> intent, where both the <PlayMusic> intent and the <ChangeVolume> intent are executed by a 3P music skill system. For further example, a pair of intents may include a <BookPlaneTicket> intent and a <PlayMusic> intent, where the <BookPlaneTicket> intent is executed by a 3P skill system and the <PlayMusic> intent is executed by a 1P skill system.

Intent pair data may additionally or alternatively be user specific. For example, if a user routinely inputs a natural language input, corresponding to a <ChangeVolume> intent, subsequent to inputting a natural language input corresponding to a <PlayMusic> intent, the speech processing system 120 may increase the score associated with a pair of intents corresponding to these intents. Conversely, if the user rarely inputs a natural language input, corresponding to a <ChangeVolume> intent, subsequent to inputting a natural language input corresponding to a <PlayMusic> intent, the speech processing system 120 may decrease the score associated with a pair of intents correspond to these intents.

The content injection component 285 may additionally or alternatively base its determinations at least in part on data specific to the user 5 that input the presently being processed natural language input. Each user may have a different tolerance regarding how many times unsolicited content is output in a given period of time, what kinds of unsolicited content are output, as well as how unsolicited content is presented.

The content injection component 285 may receive user identity data 505 from the user recognition component 295. The user identity data 505 may indicate one or more users that likely input the presently being processed natural language input. The content injection component 285 may thereafter query the profile storage 270 for user profile data 525 specific to the user that most likely input the presently being processed natural language input.

The user profile data 525 may indicate a maximum number of times the user 5 has indicated the speech processing system 120 may output unsolicited content in a specific period of time (e.g., twice/hour, ten (10) times/day, etc.). The maximum number of times may be irrespective to any specific skill system 125, entity and/or represented in the NLU results data 515, or the like. For example, the user profile data 525 may indicate the speech processing system 120 may output unsolicited content a maximum of ten (10) times a day. If the content injection component 285 determines the speech processing system 120 has output unsolicited content to the user 5 less than ten (10) times during a calendar day in which the present natural language input was received, the content injection component 285 may generate content injection data 545 indicating unsolicited content should be output in conjunction with a response to the present natural language input. If the content injection component 285 determines the system has already output unsolicited content to the user 5 ten (10) times during the calendar data in which the present natural language input was received, the content injection component 285 may not generate content injection data 545, thereby ending processing with respect to the output of unsolicited content and thereby resulting in unsolicited content not being output (in conjunction with content responsive to the present natural language input) by the speech processing system 120.

The user profile data 525 may additionally or alternatively indicate a user preference regarding how often (e.g., a frequency) unsolicited content associated with a content type may be output in a specific amount of time. Additionally or alternatively, the user profile data 525 may indicate a user preference regarding how often unsolicited content may be output in a specific amount of time with respect to a content type corresponding to a natural language input. Content types include, but are not limited to, songs, news information, videos, concert ticket offers, shopping discounts, and newly available skill systems. For example, a first user preference of a first user may indicate unsolicited content corresponding to songs may be output up to ten (10) times a day, whereas a second user preference of a second user may indicate unsolicited content corresponding to songs may be output up to two (2) times a week. For further example, a first user preference of a first user may indicate unsolicited content may be output with regarding up to ten (10) natural language inputs corresponding to requests to play music in a single day whereas a second user preference of a second user may indicate unsolicited content may be output regarding up to two (2) natural language inputs corresponding to requests to play music in a single a week.

The user profile data 525 may additionally or alternatively indicate a user preference regarding the times at which the user 5 permits the speech processing system 120 to output unsolicited content. For example, a user preference may indicate the speech processing system 120 is permitted to output a first amount of unsolicited content over the duration of a morning, and is permitted to output a second amount of unsolicited content over the duration of an evening. The content injection component 285 may determine a time representing when the presently being processed natural language input was received (with such time be represented in, for example, the other data 535). If the content injection component 285 determines the speech processing system 120 has output unsolicited content to the user 5 less times than permitted (as indicated by the user preference) for the time corresponding to receipt of the present natural language input, the content injection component 285 may generate content injection data 545. If the content injection component 285 determines the speech processing system 120 has already output unsolicited content a number of permitted times (as indicated by the user preference) for the time corresponding to when the present natural language input was received, the content injection component 285 may not generate content injection data 545.

The user profile data 525 may additionally or alternatively indicate a user preference regarding the types of natural language inputs with respect to which the user 5 permits, as well as does not permit, the speech processing system 120 to output unsolicited content. For example, the user preference may indicate the speech processing system 120 may output unsolicited content when the natural language input corresponds to a request to play music. For further example, the user preference may indicate the speech processing system 120 may not output unsolicited content when the natural language input corresponds to a request to purchase a product using a shopping skill system. If the content injection component 285 determines an intent (included in NLU results data 515 representing a present natural language input) corresponds to one with respect to which the speech processing system 120 is permitted (as indicated by the user preference) to output unsolicited content, the content injection component 285 may generate content injection data 545. If the content injection component 285 determines an intent (included in NLU results data 515 representing a present natural language input) corresponds to one with respect to which the speech processing system 120 is not permitted (as indicated by the user preference) to output unsolicited content, the content injection component 285 may not generate content injection data 545.

The user profile data 525 may additionally or alternatively indicate various characteristics of the user 5. The user profile data 525 may indicate an age of the user 5, as users of different ages may be receptive to receiving different amounts and/or kinds of unsolicited content. The user profile data 525 may additionally or alternatively indicate a culture of the user 5, as users of different cultures may be receptive to receiving different amounts and/or kinds of unsolicited content. The user profile data 525 may additionally or alternatively indicate a geographic region, country, or other geographic location corresponding to the user's residence, as users residing in different geographic locations may be receptive to receiving different amounts and/or kinds of unsolicited content. If the content injection component 285 determines the characteristic(s) of the user 5 indicates unsolicited content should be output, the content injection component 285 may generate content injection data 545. If the content injection component 285 determines the characteristic(s) of the user 5 indicates unsolicited content should not be output, the content injection component 285 may not generate content injection data 545.

The user profile data 525 may additionally or alternatively indicate a user preference regarding entities, represented in NLU results data 515, with respect to which unsolicited content may be output. For example, a user preference may indicate the speech processing system 120 may output unsolicited content when the NLU results data 515 includes an entity corresponding to a particular sports team. For further example, a user preference may indicate the speech processing system 120 may not output unsolicited content when the NLU results data 515 includes an entity corresponding to a celebrity. If the content injection component 285 determines at least one entity, represented in the NLU results data 515, corresponds to an entity with respect to which a user preference indicates unsolicited content may be output, the content injection component 285 may generate content injection data 545. If the content injection component 285 determines at least one entity, represented in the NLU results data 515, corresponds to an entity with respect to which a user preference indicates unsolicited content should not be output, the content injection component 285 may not generate content injection data 545.

The other data 608 may indicate a region, country, or other geographic location of the natural language input originating-device 110, as users interacting with devices 110 located in different geographic locations may be receptive to receiving different amounts and/or kinds of unsolicited content. If the content injection component 285 determines the geographic location of the natural language input-originating device 110 indicates unsolicited content may be output, the content injection component 285 may generate content injection data 545. If the content injection component 285 determines the geographic location of the natural language input-originating device 110 indicates unsolicited content should not be output, the content injection component 285 may not generate content injection data 545.

The other data 608 may additionally or alternatively include information representing the natural language input originating-user's system usage history. The user's system usage history may represent instances of previous input natural language inputs, ASR results data, NLU results data, as well as other processing results data. The content injection component 285 may determine one or more trends in the natural language input originating-user's system usage history. For example, the content injection component 285 may determine the user 5 routinely inputs a natural language input, requesting output of weather information for a location, immediately following output of content responsive to a natural language input requesting a flight be booked to the location. The content injection component 285 may additionally or alternatively determine whether a current context (e.g., ASR results data representing the current natural language input, NLU results representing the current natural language input, etc.) correspond to any of the determined trends. If the content injection component 285 determines the current context corresponds to at least one trend, the content injection component 285 may generate content injection data 545.

The other data 608 may additionally or alternatively represent previously received user feedback indicating the appropriateness of previously output unsolicited content. The other data 608 may additionally or alternatively include social media data associated with the user, system usage history associated with the user, a history of music listened to by the user, a history of books purchased by the user, a general purchasing history of the user, a browsing history of the user, a travel history of the user, information from the user's electronic calendar, etc.

The content injection component 285 may run one or more machine learned models that may take as input one or more of the data/information detailed above, and determine whether unsolicited content should be output (e.g., determine whether content injection data 545 should be generated). The model(s) run by the content injection component 285 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may represent how closely the data matches the category.

In order to apply machine learning techniques, machine learning processes themselves need to be trained. Training a machine learning component, such as the content injection component 285, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The model(s) run by the content injection component 285 may include skill system-specific rules. Thus, if the NLU results data 515 is associated with a specific skill system, the model(s) may execute skill system-specific rules that are associated with the skill system to which the NLU results data 515 is associated. For example, the model(s) may include music skill system-specific rules that indicate unsolicited content should never be output when the music skill system is represented in NLU results data 515 since the output of the music skill system is long form music content.

In examples where a single model having skill system-specific portions is implemented, a portion of the model(s) specific to one or more skill systems may be considered static because the portion may remain constant overtime.

The model(s) run by the content injection component 285 may additionally or alternatively be personalized to the natural language input-originating user, at runtime. That is, the model(s) may be trained to consider a variety of information and, at runtime, the content injection component 285 may run the model(s) with respect to a variety of information specific to the natural language input-originating user 5.

A user may input, to the speech processing system 120, feedback regarding the appropriateness of output unsolicited content. Such feedback may be positive or negative. Moreover, a user may input feedback to the speech processing system 120 by speaking the feedback to the device 110a, by interacting with a touchscreen of the device 110b, by performing a gesture (e.g., thumbs up, thumbs down, etc.) that is captured by a camera of the device (110a/110b), etc. The speech processing system 120 may train or retrain the model(s), implemented by the content injection component 285, using the feedback so the content injection component 285 does not determine unsolicited content should be output if the current context corresponds to a previous instance where the feedback indicated the unsolicited content was not applicable to the user or otherwise inappropriate/unnecessary from the user's perspective.

The content injection component 285 may compile all applicable other data 535 and user preferences, represented as the user profile data 525 in FIG. 5, into a multi-dimensional feature vector. The content injection component 285 may impose a feature vector dimension threshold to determine whether to run the machine learned model(s) or to use default rules with respect to when unsolicited content should be output. It will be appreciated that the more user-specific dimensions a feature vector has, the more user specific the output of the model(s) may be. It will also be appreciated that running a model(s) may be operationally intensive. Thus, the feature vector dimension threshold may be configured at a value representing a diminishing return of user-specific model(s) output. That is, if the multi-dimensional feature vector includes a number of dimensions not satisfying (e.g., falling below) the feature vector dimension threshold, the reliability of a user-specific model(s) output based on the multi-dimensional feature vector does not outweigh the operational intensity of running the model(s).

The default rules for determining when unsolicited content should be output may be configured with respect to a default user. For example, the default rules may be based on the culture of a default user, the geographic location (e.g., country, region, etc.) of a default user, the maximum number of times a default user would permit the speech processing system 120 to output unsolicited content in a specific period of time, etc.

The content injection component 285 may generate and output content injection data 545 indicating unsolicited content should be output. The content injection component 285 may send the content injection data 545 to a contention generation skill system 125a configured to determine unsolicited content associated with but not directly responsive to the current natural language input. The content injection data 545 may include at least a portion of the NLU results data 515, and optionally at least a portion of the user profile data 525 and/or at least a portion of the other data 535.

The content injection data 545 may indicate a specific skill system 125 that should be queried for unsolicited content. As described above, a skill system 125 may output, to the speech processing system 120, data indicating that any time the NLU results data 515 indicate a particular intent, the content injection component 285 should query the skill system 125 as to whether the skill system 125 has unsolicited content that may be output. When the content injection component 285 determines the NLU results data 515 indicate the particular intent, the content injection data 545 may include an indication that the content injection skill system 125a should query the specific skill system 125 for unsolicited content associated with one or more entities represented in the NLU results data 515.

The content injection skill system 125a may determine a content system 130 from which to receive unsolicited content from based at least in part on the NLU results data 515. For example, the content injection skill system 125a may determine the NLU results data 515 includes a <PlayMusic> intent and "Adele" as an entity. Based thereon, the content injection skill system 125a may determine a concert booking content system 130 from which to receive unsolicited content from.

The content injection skill system 125a (or, alternatively for example, the orchestrator component 230) may send, to the content system 130, a request 555 for unsolicited content. In at least some examples, the request 555 may indicate at least a portion of the entities represented in the NLU results data 515 that the content system 130 may use to determine unsolicited content. The speech processing system 120, in at least some examples, may determine first output data, responsive to the natural language input, prior to determining the content system 130 from which to receive unsolicited content. Alternatively, the speech processing system 120 may determine the content system 130, from which to receive unsolicited content, after determining the NLU results data 515 but prior to determining the first output data.

The content system 130 may send, to the content injection skill system 125a, unsolicited content 565 associated with but not directly responsive to the natural language input. In at least some examples, the content system 130 may be unable to determine unsolicited content. In such examples, the content system 130 may send, to the content injection skill system 125a, an indication of such, in which case the contention injection skill system 125a.

The content injection data 545 may, in at least some examples, indicate a modality that unsolicited content should be output in. The modality may be represented in the user profile data 525 input to the content injection component 285. For example, the user profile data 525 may indicate a user preference indicating that the user 5 prefers the speech processing system 120 to output unresponsive visual content over unresponsive audio content. In such a case, the request 555 may include a request for image data or video data if such can be obtained or generated by the content system 130.

The content injection component 285 may determine whether unsolicited content should be output while content, responsive to a natural language input, is output by the speech processing system 120. For example, a device 110 may receive a natural language input to cease output of content responsive to a natural language input while the content is be output. For example, while a song is being output, a user may say "Alexa, cancel." The device 110 may send input data, representing the user's cease output natural language input, to the speech processing system 120. The speech processing system 120 may process the input data (e.g., by performing ASR processing and NLU processing) to determine an intent to cease output of the content. The content injection component 285 may thereafter determine unsolicited content should not be output based at least in part on the intent to cease output of the original content.

The device 110 may alternatively receive a natural language input to decrease output of unsolicited content while content, responsive to a natural language input, is being output. For example, while plane ticket booking information is being output, a user may say "Alexa, only output unsolicited content 3 times a week." The speech processing system 120 may process the input data to determine an intent to decrease or otherwise alter a frequency at which unsolicited content should be output. The content injection component 285 may therefrom determine a frequency at which unsolicited content was output prior to receiving the current natural language input. If the frequency at which unsolicited content was output is equal to or greater than the decreased or otherwise altered frequency, the content injection component 285 may determine not to output unsolicited content. If the frequency at which unsolicited content was output is less than the decreased or otherwise altered frequency, the content injection component 285 may determine to output unsolicited content using the teachings disclosed herein.

It will be appreciated that, with respect to any single natural language input, the content injection skill system 125*a* may send a request 555 to more than one content system 130. The content injection skill system 125*a* may send all unsolicited content, received from the one or more queried content systems 130, to the content injection component 285. Each portion of unsolicited content, sent to the content injection component 285, may be associated with a content system identifier corresponding to the content system 130 that output the portion of unsolicited content.

In situations where the content injection component 285 determines unsolicited content should be output, as illustrated in FIG. 6, the content injection component 285 may determine (602), based on context (e.g., based on the user identity data 505, the NLU results data 515, the user profile data 525, and/or the other data 535 described above with respect to FIG. 5), a ranked list of content systems for outputting unsolicited content with respect to a present natural language input. The content injection component 285 may query (604) the holdout grouping storage 275 for a holdout group status associated with a user identifier (e.g., output from the user recognition component 295 and representing a user that most likely input the natural language input) and a top-ranked content system identifier.

The content injection component 285 may receive (606), from the holdout groupings storage 275, a holdout group status of the user identifier with respect to the content system identifier represented in the query. As illustrated in FIG. 4, in at least some examples the holdout groupings storage 275 may store "treatment" and "control" holdout group statuses. In such examples, the content injection component 285 may receive, from the holdout groupings storage 275, a "treatment" status (representing the user identifier is in a holdout treatment group associated with the queried content system identifier), a "control" status (representing the user identifier is in a holdout control group associated with the queried content system identifier), or a "no results" status (representing the user identifier is not associated with the content system identifier in the holdout groupings storage 275, and by extension representing the user identifier is not in a holdout group associated with the queried content system identifier).

In at least some examples, the holdout groupings storage 275 may not delete no longer useful holdout groups (e.g., holdout groups for which new holdout groups were generated to replace for a given experiment). Rather, each time new holdout groups are determined for an experiment, the holdout groupings storage 275 may store the new holdout groups. In such examples, the holdout groupings storage 2785 may associate, therein, holdout groups with time data representing when the holdout groups were first "active" for the experiment and when the holdout groups became inactive for the experiment (e.g., were replaced with newly generated holdout groups). In such examples, when querying the holdout groupings storage 275, the content injection component 285 may send a user identifier, a content system identifier, and time data representing a present time. The holdout groupings storage 275 may use the time data to ensure the holdout groupings storage 275 determines a holdout group status based on currently active data, and not still-stored but no longer active data.

The content injection component 285 may determine (608) the user identifier is not in a holdout group associated with the queried top-ranked content system identifier. After determining such, the content injection component 285 may receive (610) unsolicited content from the top-ranked content system 130. For example, after determining the user identifier is not in a holdout group of the top-ranked content system, the content injection component 285 may send content injection data 545 to the content injection skill system 125*a*, which may result in the content injection skill system 125*a* sending a request 555 to the top-ranked content system 130. Thereafter, the top-ranked content system 130 may send unsolicited content 565 to the content injection skill system 125*a*, which may thereafter send the unsolicited content 565 to the content injection component 285.

After receiving the unsolicited content 565, the content injection component 285 may cause the device 110 to output the unsolicited content 565. For example, the content injection component 285 may send (612) the unsolicited content 565 to the orchestrator component 230, which may send (614) the unsolicited content 565 to the device 110 for output.

In at least some examples, the unsolicited content is to be output as audio, and the unsolicited content sent from the content injection component 285 to the orchestrator component 230 is text. In such examples, the orchestrator component 230 may send the text to the TTS component 280. The TTS component 280 may perform TTS processing on the text to generate synthesized speech corresponding to the unresponsive text. The TTS component 280 may send the synthesized speech to the orchestrator component 230, which may thereafter send the synthesized speech to the device 110 for output.

FIGS. 7A and 7B illustrate processing performed when the user is in a holdout control group of an experiment. As illustrated, after the content injection component 285 receives (606) a holdout group status, the content injection component 285 may determine (702) the holdout group status represents the user identifier is in a holdout control group associated with the top-ranked content system identifier. The content injection component 285 not determine (704) unsolicited content should not be output based on the user identifier being represented in the holdout control group.

After determining unsolicited content should not be output, the content injection component 285 may cause (706) subsequent system usage, associated with the user identifier, to the recorded. For example, the content injection component 285 may cause system usage of a same dialog as the natural language input (e.g., user inputs associated with the user identifier and received by the speech processing system 120 after the natural language input but as part of a same dialog as the natural language input) to be recorded.

As used herein, a "dialog" may refer to data transmissions (such as relating to multiple user inputs and speech processing system 120 outputs) between the speech processing system 120 and a device(s) 110 that all relate to a single originating user input. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier.

FIGS. 8A and 8B illustrate processing performed when the user is in a holdout treatment group of an experiment. As illustrated, after the content injection component 285 receives (606) a holdout group status, the content injection component 285 may determine (802) the holdout group status represents the user identifier is in a holdout treatment group associated with the top-ranked content system identifier.

After determining the user identifier is in the holdout treatment group, the content injection component 285 may receive (610) unsolicited content from the top-ranked content system 130. After receiving the unsolicited content, the content injection component 285 may cause the device 110 to output the unsolicited content 565. For example, the content injection component 285 may send (612) the unsolicited content to the orchestrator component 230, which may send (614) the unsolicited content to the device 110 for output.

The content injection component 285 may cause (804) subsequent system usage, associated with the user identifier, to the recorded. For example, the content injection component 285 may cause system usage of a same dialog as the natural language input (e.g., user inputs associated with the user identifier and received by the speech processing system 120 after the unsolicited content is output but as part of a same dialog as the natural language input) to be recorded.

The content injection component 285 may cause system usage to be recorded (at steps 706 and 804) by, in at least some examples, publishing an event to an event stream. Various components of the speech processing system 120 may have access to the event stream. As such, a system usage recording component may determine publishing of a foregoing event to the event stream by the content injection component 285, and may thereafter record system usage associated with the user identifier.

Processing of the content injection component 285 may be updated based at least in part on recorded system usages of users represented in associated holdout control and treatment groups. More specifically, in at least some examples, how the content injection component 285 ranks content systems 130 may be updated based at least in part on recorded system usages of users represented in associated holdout control and treatment groups.

Figure 9:
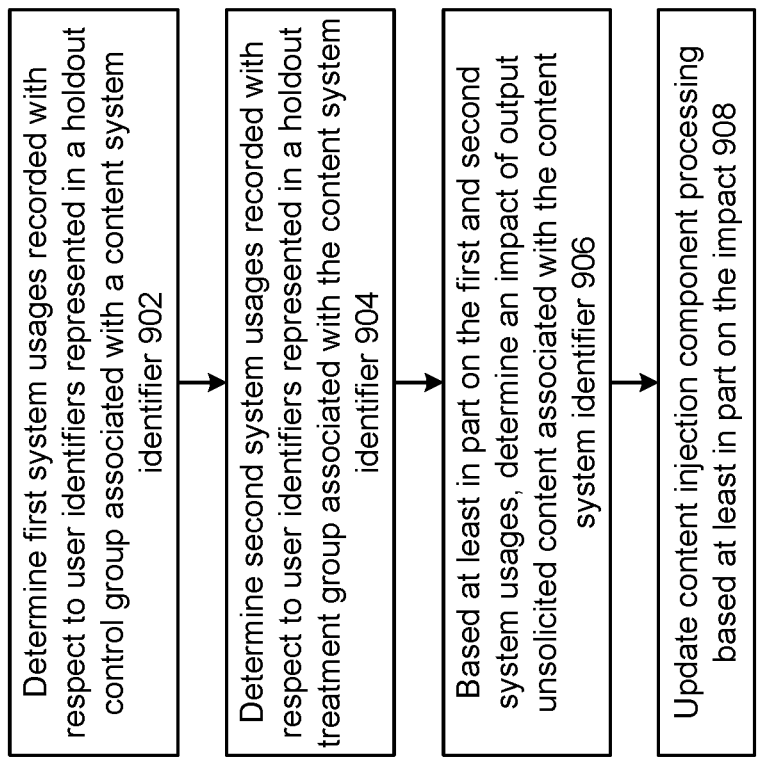
FIG. 9 is a process flow diagram illustrating use of recorded system usages to update future output of unsolicited content.

With reference to FIG. 9, the speech processing system 120 may determine (902) first system usages recorded with respect to user identifiers represented in a holdout control group associated with a content system identifier. The speech processing system 120 may additionally determine (904) second system usages recorded with respect to user identifiers represented in a holdout treatment group associated with the same content system identifier. The holdout groups determined at step 902 and 904 may be holdout groups that were "in effect" at the same time.

The speech processing system 120 may, based at least in part on the first and second system usages, determine (906) an impact of output unsolicited content associated with the content system identifier. For example, the speech processing system 120 may determine that users, in the holdout treatment group, input more natural language inputs to the speech processing system 120 after receiving the content system's unsolicited content, as compared to users in the holdout control group. For further example, the speech processing system 120 may determine that users, in the holdout treatment group, converted on the content system's unsolicited content (e.g., purchased an advertised product, used an advertised skill system, downloaded a related application, etc.), as compared to users in the holdout control group that did not (on average) make such purchases or use such skill systems.

The speech processing system 120 may update (908) processing of the content injection component 285 based at least in part on the determined impact. For example, if the speech processing system 120 determines the content system's unsolicited content generally improved the user experience, the content injection component 285's processing may be updated to more favorably rank the content system in the future. Conversely, if the speech processing system 120 determines the content system's unsolicited content generally does not improve the user experience, the content injection component 285's processing may be updated to rank the content system less favorably in the future.

Figure 10:
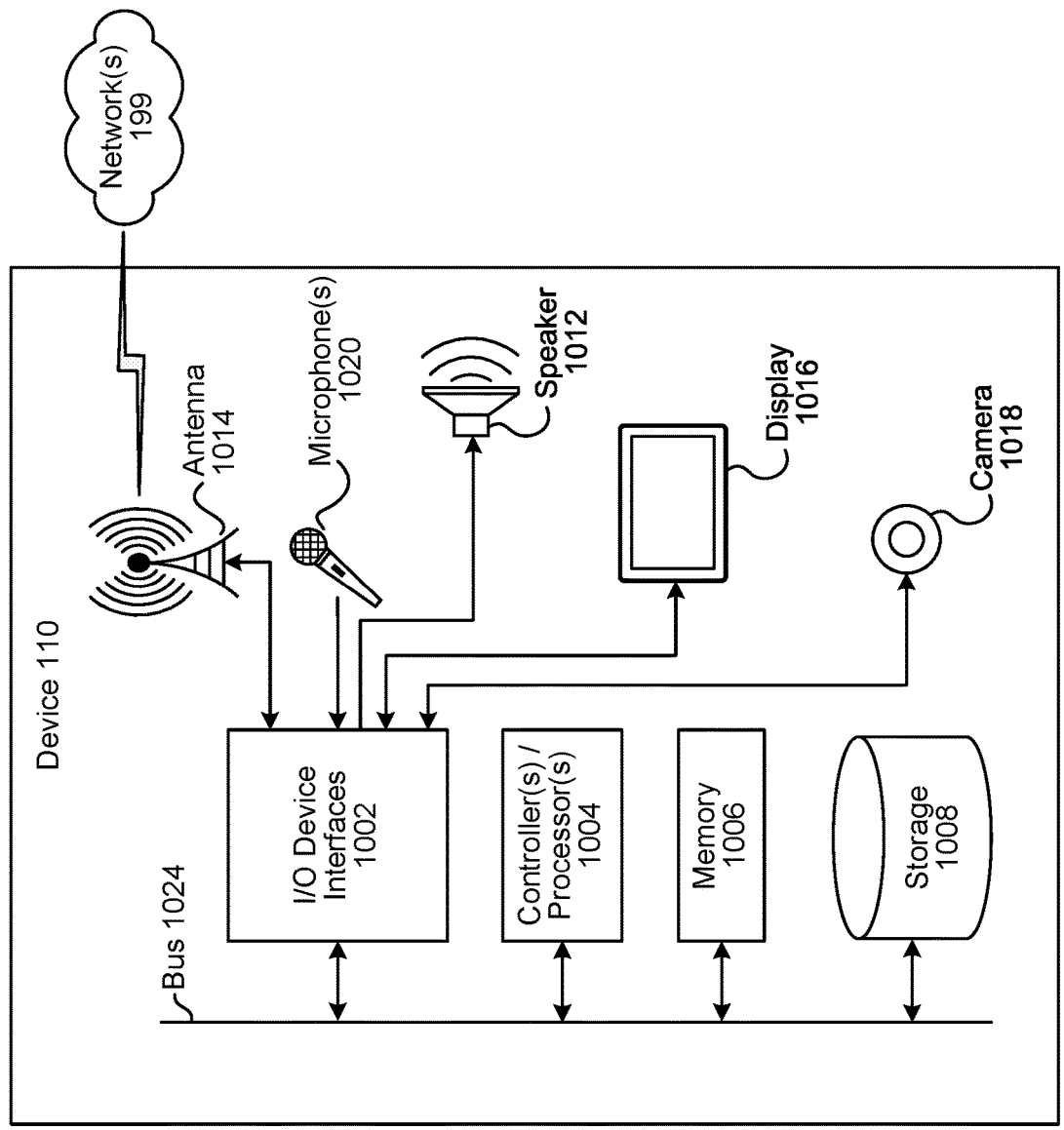
FIG. 10 is a block diagram conceptually illustrating example components of a device.
Figure 11:
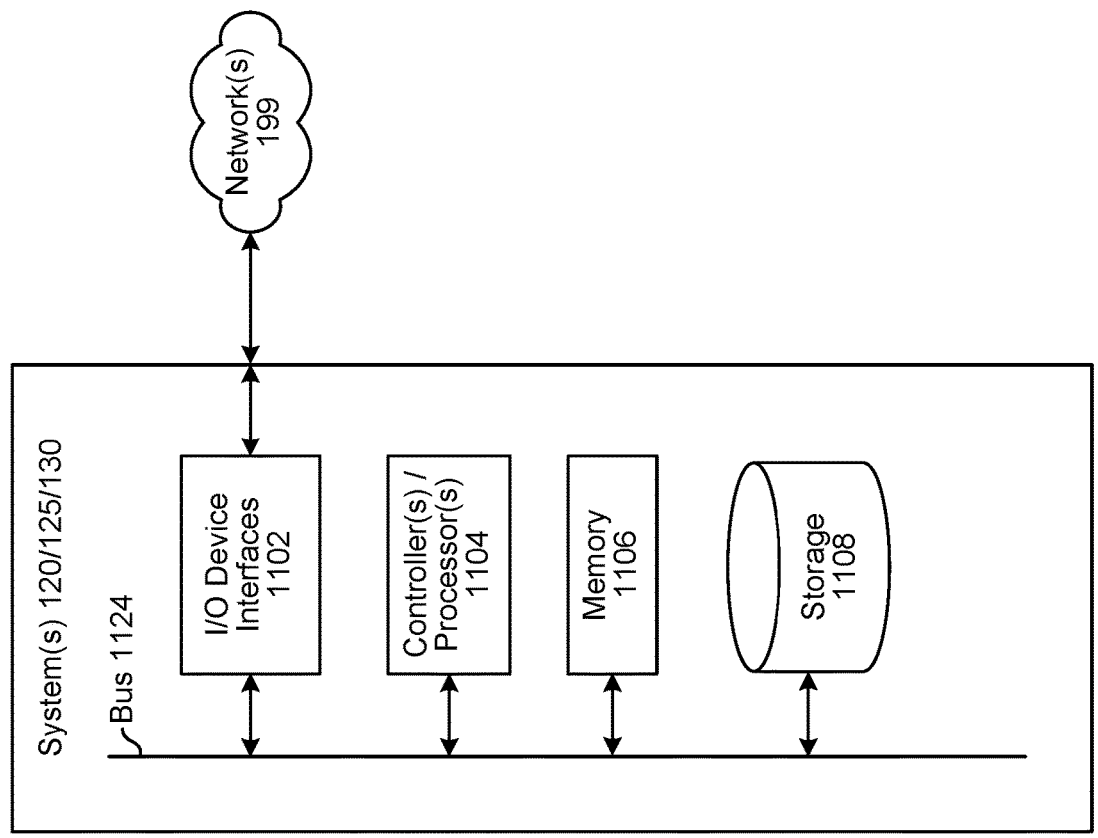
FIG. 11 is a block diagram conceptually illustrating example components of a system.

FIG. 10 is a block diagram conceptually illustrating a device 110 that may be used with the system. FIG. 11 is a block diagram conceptually illustrating example components of a remote device, such as the natural language processing speech processing system 120, which may assist with ASR processing, NLU processing, etc.; a skill system 125; and a content system 130. A system (120/125/130) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The speech processing system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125/130) may be included in the overall system 100 of the present disclosure, such as one or more speech processing systems 120 for performing ASR processing, one or more speech processing systems 120 for performing NLU processing, one or more skill systems 125, one or more content systems 130, etc. In operation, each of these systems may include computer-readable and computer-executable instructions that reside on the respective device (120/125), as will be discussed further below.

Each of these devices (110/120/125/130) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/125/130) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/125/130) may also be connected to removable or external non-volatile memory and/or storage (such as a removable memory card, memory key drive, networked storage, etc.) through respective input/output device interfaces (1002/1102).

Computer instructions for operating each device (110/120/125/130) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/125/130) includes input/output device interfaces (1002/1102). A variety of components may be connected through the input/output device interfaces (1002/1102), as will be discussed further below. Additionally, each device (110/120/125/130) may include an address/data bus (1024/1124) for conveying data among components of the respective device. Each component within a device (110/120/125/130) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device 110, the natural language processing speech processing system 120, a skill system 125, and/or a content system 130 may include their own dedicated processors, memory, and/or storage. Alternatively, one or more of the components of the device 110, the natural language processing speech processing system 120, a skill system 125, and/or a content system 130 may utilize the I/O interfaces (1002/1102), processor(s) (1004/1104), memory (1006/1106), and/or storage (1008/1108) of the device(s) 110, natural language processing speech processing system 120, the skill system 125, or the content system 130, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing speech processing system 120, a skill system 125, and a content system 130, as described herein, are illustrative, and may be located as a stand-alone device or may be included, in whole or in part, as a component of a larger device or system.

Figure 12:
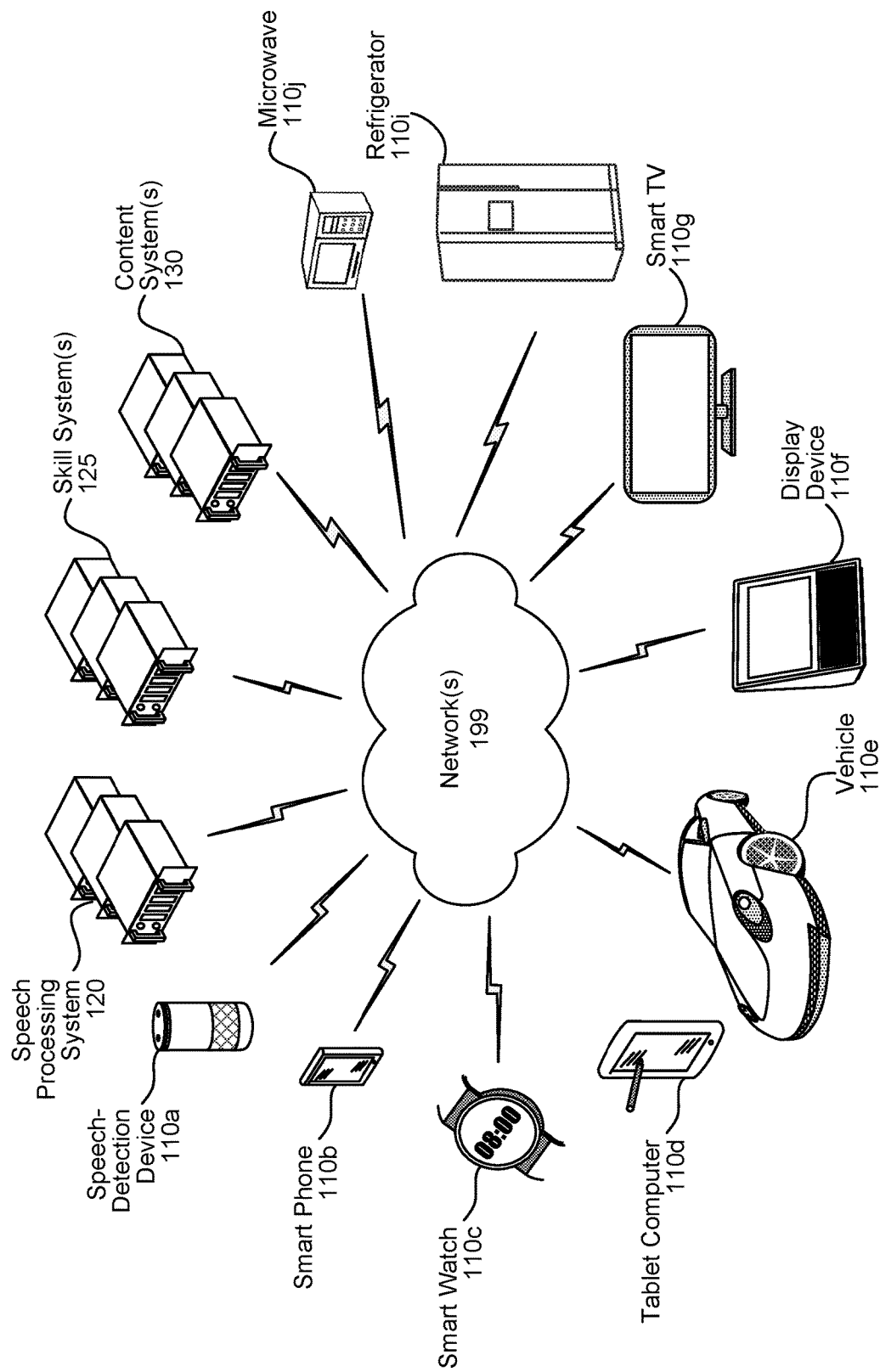
FIG. 12 illustrates an example of a computer network for use with the overall system.

As illustrated in FIG. 12, multiple devices (110*a*-110*i*, 120, 125, 130) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a display device 110*f*, a smart television 110*g*, a refrigerator 110*h*, and/or a microwave 110*i* may be connected to the network(s) 199 through a wireless service provider, over a WiFi or cellular network connection, or the like. Other devices are included as network-connected support devices, such as the natural language processing speech processing system 120, the skill system(s) 125, the content system(s) 130, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language processing speech processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
    during a first time period:
        determining a plurality of user identifiers to potentially receive output content corresponding to a test of unresponsive content for a speech processing system;
        determining a content system identifier corresponding to first content to be tested;
        determining a timestamp corresponding to a beginning of a first test corresponding to the content system identifier; and
        using a function, processing the content system identifier, the plurality of user identifiers, and the timestamp to generate a holdout treatment group for the first test, the holdout treatment group comprising a subset of the plurality of user identifiers;
    during a second time period after the first time period:
        receiving, from a first device, first audio data representing a first utterance;
        determining second content responsive to the first utterance;
        determining a first user identifier associated with the first audio data;
        determining unsolicited content, corresponding to a topic different than the first utterance, is to be output;
        determining the content system identifier is to be used to output the first content as the unsolicited content;
        determining the first user identifier is represented in the holdout treatment group;
        sending, to the first device, the second content for output;
        based at least in part on determining the first user identifier is represented in the holdout treatment group, send, to the first device, the first content for output;
        after sending the first content to the first device, receiving, from the first device, second audio data representing a second utterance; and
        storing system usage data associating the second utterance and the content system identifier;
    during a third time period after the second time period:
        based at least in part on the system usage data, generating updated ranking data indicating how the content system identifier is ranked when determining what content system to invoke at runtime.

2. The method of claim 1, further comprising:
    during the first time period:
        using the function to generate:
            a non-holdout group comprising a second subset of the plurality of user identifiers, the non-holdout group being omitted from the first test, and
            a holdout control group comprising a third subset of the plurality of user identifiers, wherein the speech processing system refrains from outputting the first content with respect to the holdout control group during the first test, and with respect to which second system usage data is recorded,
        wherein generating the updated ranking data is further based at least in part on the second system usage data.

3. The method of claim 1, further comprising:
    during a fourth time period after the third time period:
        determining a second plurality of user identifiers to potentially receive output content; and
        using the function, processing the content system identifier, the second plurality of user identifiers, and the timestamp to generate a second holdout treatment group for the first test, the second holdout treatment group comprising a subset of the second plurality of user identifiers.

4. The method of claim 1, further comprising:
    during the second time period:
        generating natural language understanding (NLU) results data representing the first utterance;
        based at least in part on the NLU results data, determining a plurality of content system identifiers comprising the content system identifier;
        ranking the plurality of content system identifiers to generate a plurality of ranked content system identifiers; and
        determining the content system identifier is a highest ranked of the plurality of ranked content system identifiers,
        wherein the first user identifier is determined to be represented in the holdout treatment group after determining the content system identifier is the highest ranked.

5. A method comprising:
    processing a content system identifier and a first user identifier to determine first data representing the first user identifier is to be used to output first content during a first period of time;
    after determining the first user identifier is to be used to output the first content during the first period of time, receiving, from a first device, first input data representing a natural language input;
    determining second content responsive to the natural language input;

determining the first user identifier is associated with the first input data;

determining the content system identifier is to be used to output the first content in coordination with the second content, wherein the first content is unsolicited by the natural language input;

determining the first device is to output the first content based at least in part on:
the first data,
determining the first user identifier is associated with the first input data, and
determining the content system identifier is to be used to output the first content in coordination with the second content;

sending, to the first device, the first content for output; and
sending, to the first device, the second content for output.

6. The method of claim 5, further comprising:
after sending the second content to the first device, receiving second input data representing a second natural language input, the second input data corresponding to the first user identifier;
storing system usage data associating the second input data and the content system identifier; and
based at least in part on the system usage data, generating ranking data indicating how the content system identifier is to be ranked when determining what content system to invoke at runtime.

7. The method of claim 5, further comprising:
after sending the second content to the first device, receiving second input data representing a second natural language input, the second input data corresponding to a second user identifier with respect to which a speech processing system refrains from outputting the second content during the first period of time;
storing system usage data associating the second input data and the content system identifier; and
based at least in part on the system usage data, generating ranking data indicating how the content system identifier is to be ranked when determining what content system to invoke at runtime.

8. The method of claim 5, further comprising:
prior to receiving the first input data, using a function to generate a first plurality of user identifiers including the first user identifier and being associated with the content system identifier, the first plurality of user identifiers configured to receive the second content during the first period of time; and
after sending the second content to the first device, using the function to generate a second plurality of user identifiers configured to receive the second content during a second period of time after the first period of time.

9. The method of claim 8, wherein inputs to the function comprise:
the content system identifier;
a third plurality of user identifiers; and
time data corresponding to a beginning time of the first period of time.

10. The method of claim 8, further comprising:
prior to receiving the first input data, using the function to generate:
a third plurality of user identifiers with respect to which a speech processing system refrains from outputting the second content during the first period of time, and
a fourth plurality of user identifiers with respect to which the speech processing system refrains from outputting the second content during the first period of time, and with respect to which system usage data is recorded for use in determining what content system to invoke at runtime.

11. The method of claim 5, wherein the content system identifier is determined based at least in part on determining the natural language input corresponding to a first natural language understanding intent.

12. The method of claim 5, further comprising:
receiving, from a second device, second input data representing a second natural language input;
determining a second user identifier associated with the second input data;
determining the second content is to be output, the second content corresponding to a different topic than the second natural language input;
determining the second user identifier is missing from a plurality of user identifiers associated with the content system identifier and configured to receive the second content during the first period of time; and
based at least in part on determining the second user identifier is missing from the plurality of user identifiers:
refraining from outputting the second content, and
determining system usage data, associated with the second user identifier, is to be recorded for generating ranking data indicating how the content system identifier is to be ranked when determining what content system to invoke at runtime.

13. A system comprising:
at least one processor; and
at least one memory comprising instructions that, when executed by the at least one processor, cause the system to:
process a content system identifier and a first user identifier to determine first data representing the first user identifier is to be used to output first content during a first period of time;
after determining the first user identifier is to be used to output the first content during the first period of time, receive, from a first device, first input data representing a natural language input;
determine second content responsive to the natural language input;
determine the first user identifier is associated with the first input data;
determine the content system identifier is to be used to output the first content in coordination with the second content, wherein the first content is unsolicited by the natural language input;
determine the first device is to output the first content based at least in part on:
the first data,
determining the first user identifier is associated with the first input data, and
determining the content system identifier is to be used to output the first content in coordination with the second content;
send, to the first device, the first content for output; and
send, to the first device, the second content for output.

14. The system of claim 13, wherein the at least one memory further comprises instructions that, when executed by the at least one processor, further cause the system to:
after sending the second content to the first device, receive second input data representing a second natural language input, the second input data corresponding to the first user identifier;

store system usage data associating the second input data and the content system identifier; and based at least in part on the system usage data, generating ranking data indicating how the content system identifier is to be ranked when determining what content system to invoke at runtime.

15. The system of claim 14, wherein the at least one memory further comprises instructions that, when executed by the at least one processor, further cause the system to:

after sending the second content to the first device, receive third input data representing a third natural language input, the third input data corresponding to a second user identifier with respect to which a speech processing system refrains from outputting the second content during the first period of time;

store system usage data associating the third input data and the content system identifier; and based at least in part on the system usage data, generate ranking data indicating how the content system identifier is to be ranked when determining what content system to invoke at runtime.

16. The system of claim 13, wherein the at least one memory further comprises instructions that, when executed by the at least one processor, further cause the system to:

prior to receiving the first input data, use a function to generate a first plurality of user identifiers including the first user identifier and being associated with the content system identifier, the first plurality of user identifiers configured to receive the second content during the first period of time; and after sending the second content to the first device, use the function to generate a second plurality of user identifiers configured to receive the second content during a second period of time after the first period of time.

17. The system of claim 16, wherein inputs to the function comprise:

the content system identifier;

a third plurality of user identifiers; and time data corresponding to a beginning time of the first period of time.

18. The system of claim 16, wherein the at least one memory further comprises instructions that, when executed by the at least one processor, further cause the system to:

prior to receiving the first input data, use the function to generate:

a third plurality of user identifiers with respect to which a speech processing system refrains from outputting the second content during the first period of time, and a fourth plurality of user identifiers with respect to which a speech processing system refrains from outputting the second content during the first period of time, and with respect to which system usage data is recorded for use in determining what content system to invoke at runtime.

19. The system of claim 13, wherein the at least one memory further comprises instructions that, when executed by the at least one processor, further cause the system to:

determine the content system identifier based at least in part on determining the natural language input corresponding to a first natural language understanding intent.

20. The system of claim 13, wherein the at least one memory further comprises instructions that, when executed by the at least one processor, further cause the system to:

receive, from a second device, second input data representing a second natural language input;

determine a second user identifier associated with the second input data;

determine the second content is to be output, the second content corresponding to a different topic than the second natural language input;

determine the second user identifier is missing from a plurality of user identifiers associated with the content system identifier and configured to receive the second content during the first period of time; and based at least in part on determining the second user identifier is missing from the plurality of user identifiers:

refrain from outputting the second content, and determine system usage data, associated with the second user identifier, is to be recorded for generating ranking data indicating how the content system identifier is to be ranked when determining what content system to invoke at runtime.

* * * * *